(12) United States Patent
Cohen et al.

(10) Patent No.: US 6,337,925 B1
(45) Date of Patent: Jan. 8, 2002

(54) METHOD FOR DETERMINING A BORDER IN A COMPLEX SCENE WITH APPLICATIONS TO IMAGE MASKING

(75) Inventors: Scott D. Cohen, Palo Alto; Gregg Wilensky, San Jose, both of CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/566,632

(22) Filed: May 8, 2000

(51) Int. Cl.⁷ .............................. G06K 9/48; G06K 9/00; G06K 9/40
(52) U.S. Cl. ................... 382/199; 382/205; 382/164; 382/261
(58) Field of Search ................................ 382/199, 200, 382/205, 190, 195, 164, 261, 266, 263

(56) References Cited

U.S. PATENT DOCUMENTS

| | | | | |
|---|---|---|---|---|
| 5,668,888 A | * | 9/1997 | Doi et al. | 382/132 |
| 6,021,222 A | * | 2/2000 | Yamagata | 382/199 |
| 6,208,763 B1 | * | 3/2001 | Avinash | 382/254 |

OTHER PUBLICATIONS

Alvy Ray Smith et al., "Blue Screen Matting", Computer Graphics Proceedings, Annual Conference Series (1996), pp. 259–268.
"Adobe Photoshop 5.0—User Guide", Chapter 7, pp. 137–153, Chapter 10, pp. 249–251.
"Adobe Photoshop's Background Eraser Tool", 2 pages.
"Adobe Photoshop's Magnetic Lasso Tool", 2 pages.
"Ultimatte KnockOut—User Guide", ©1998, Table of Contents and pp. 1–37.
"Mask Pro 2.0 Reviewer's Guide", ©1998, Extensis Corporation, pp. 1–18.
"Extensis—Cut Complex Masking Down to Size with Professional Precision Masking Tools for Adobe Photoshop", ©2000, pp. 1–3, www.extensis.com/maskpro/.
Mortensen et al., "Toboggan–Based Intelligent Scissors with a Four–Parameter Edge Model", Computer Vision and Pattern Recognition (CVPR), pp. 1–7 (1999).
Mortensen et al., "Intelligent Scissors for Image Composition", Computer Graphics Proceedings, Annual Conference Series, pp. 191–198, Aug. 1995.

* cited by examiner

*Primary Examiner*—Amelia M. Au
*Assistant Examiner*—Mehrdad Dastouri
(74) *Attorney, Agent, or Firm*—Fish & Richardson P.C.

(57) ABSTRACT

A method is used for identifying a border in a digital image that is defined by a plurality of pixels, each pixel being defined by a pixel color and a pixel position indicating a location of the pixel in the digital image. The method includes receiving for each pixel a pixel gradient indicating a direction and magnitude of change in color. A user inputs an area of interest that includes at least a portion of the border to be identified. The method then includes estimating information about an edge zone that models the border portion including estimating a position, direction, and width of the edge zone. The position of the edge zone is estimated by calculating a weighted average value of pixel positions of each pixel in the area of interest. The direction of the edge zone is estimated by calculating a weighted average value of pixel gradient direction of each pixel in the area of interest. The method further includes calculating a measure of confidence in the edge zone information and estimating a width of the edge zone at which the calculated measure of confidence decreases appreciably if the estimated width increases. The border is identified based on the estimated edge zone information. An identified border is used to improve masking an object bound by the identified border from the digital image.

91 Claims, 18 Drawing Sheets

(6 of 18 Drawing Sheet(s) Filed in Color)

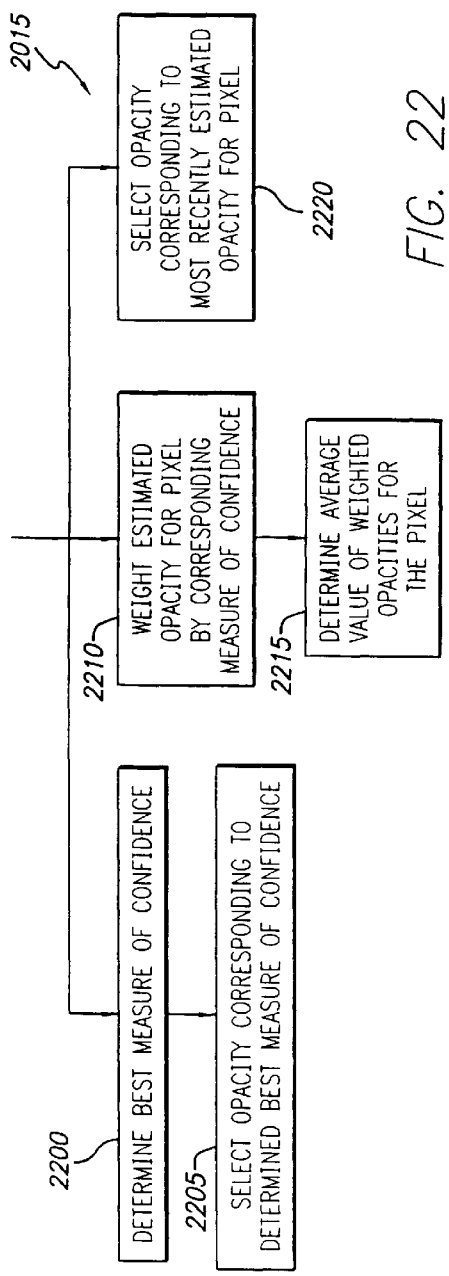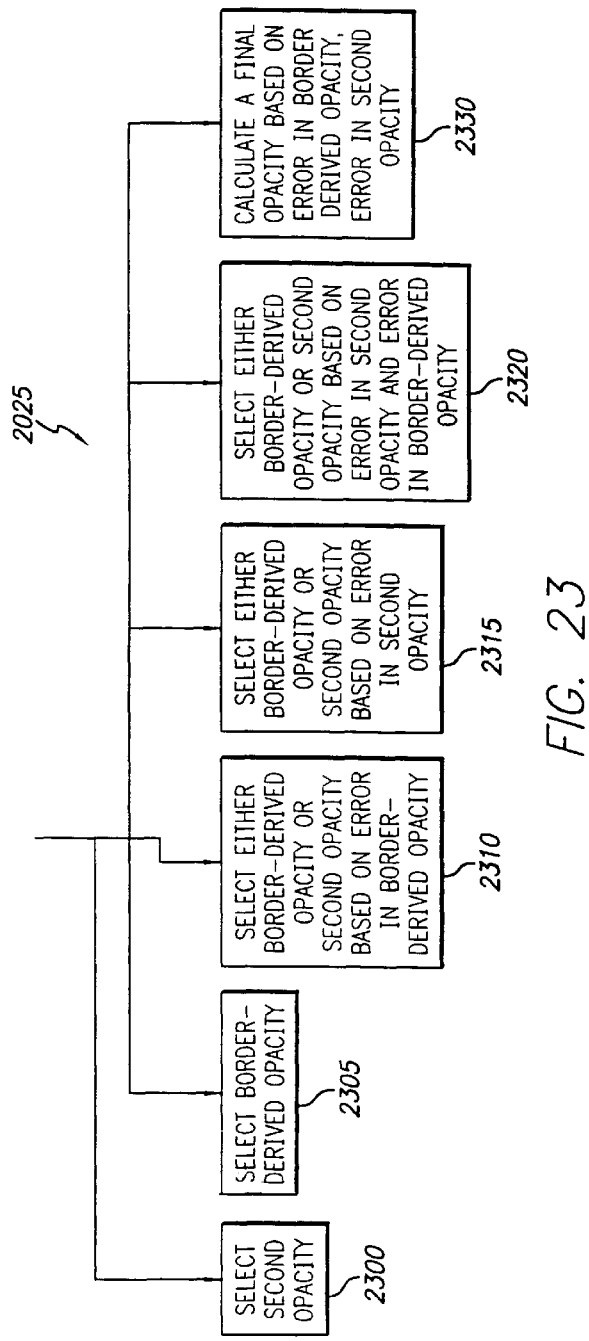

METHOD FOR DETERMINING A BORDER IN A COMPLEX SCENE WITH APPLICATIONS TO IMAGE MASKING

TECHNICAL FIELD

This invention relates generally to computing systems and more specifically to systems and methods for detecting a border in a digital image.

BACKGROUND

A digital image is a collection of digital information that may be cast into the form of a visual image. Digital images may include, for example, photographs, artwork, documents, and web pages. Digital images may be obtained, for example, from digital cameras, digital video, scanners, and facsimile. The images may be two-dimensional or multi-dimensional. For example, three-dimensional images may include representations of three-dimensional space, or of two-dimensional movies, where the third dimension is time.

The fundamental element of a digital image is a pixel. Referring to FIG. 1, a digital image 100 is shown which is 10 pixels wide and 10 pixels high. A single pixel 105 in this image 100 is represented by a square. Generally, a pixel has a specific location (designated in two-dimensional space as $\vec{r} = (x, y)$) in the digital image and it contains color information for that location. Color information represents a vector of values, the vector characterizing all or a portion of the image intensity information. Color information could, for example, represent red (R), green (G), and blue (B) intensities in an RGB color space. Or, as shown in FIG. 1, color information may represent a single luminosity in a grayscale color space.

A color space is a multi-dimensional space in which each point in the space corresponds to a color. For example, RGB color space is a color space in which each point is a color formed of the additive amounts of red, green and blue colors. As another example, color information could represent information such as cyan-magenta-yellow (CMY), cyan-magenta-yellow-black (CMYK), Pantone, Hexachrome, x-ray, infrared, and gamma ray intensities from various spectral wavelength bands. Thus, for example, in CMY color space, each point is a color formed of the combination of cyan, magenta, and yellow colors. Color information may, in addition, represent other modalities of information, such as acoustic amplitudes (sonar, ultrasound) or magnetic resonance imaging (MRI) amplitudes.

In RGB color space, levels of red, green, and blue can each range from 0 to 100 percent of full intensity. Each level can be represented by a range of decimal numbers from, for example, 0 to 255 (256 levels for each color) with an equivalent range of binary numbers extends from 00000000 to 11111111. The total number of available colors would therefore be 256×256×256, or 16,777,216 possible colors.

One way to express the color of a particular pixel relative to other pixels in an image is with a gradient vector (designated as $\vec{G}$). The gradient vector at the particular pixel is an indication of a direction and magnitude of change in colors of pixels relative to the particular pixel and it may be calculated using the color and position information inherently associated with the pixels in the image. Generally, the gradient vector for a pixel at a position $\vec{r}$ may be designated as $\vec{G}(\vec{r}) = (g(\vec{r}) \cos \omega(\vec{r}), g(\vec{r}) \sin \omega(\vec{r}))$, where $G(\vec{r}) = |\vec{G}(\vec{r})|$ is the magnitude of the gradient vector at the pixel located at position $\vec{r}$ and $\omega(\vec{r})$ is the angle or direction of the gradient vector at the pixel located at position $\vec{r}$. An example of a gradient vector is shown schematically by vector 110, which points in the direction of the greatest change in color, and whose magnitude indicates the amount of color change. In the case of a linear boundary that bisects a first region that is white and a second region that is black, the gradient vector at each pixel along the boundary would be of the same magnitude and angle (which would be perpendicular to the linear direction of the boundary). Moreover, the gradient magnitude at a pixel outside of the linear boundary and distinctly within one of the white or black regions would be zero because the surrounding pixels have the same color as that pixel.

It is common for one working with a digital image to cut or separate a foreground region of the image from a background region of the image. The foreground region often corresponds to an object or set of objects in the image. Alternatively, the foreground region may correspond to a region outside of an object or set of objects. In any case, regions of the image that are not part of the desired foreground region may be referred to as background regions.

Referring to the example of FIGS. 2a and 2b, digital image 200 includes a foreground region 202 (the chair) and a background region 204 (the hallway, doors, floor, windows, and walls). While foreground region 202 only includes a single object (the chair) that is highlighted in FIG. 2b, foreground region 202 can include plural objects some of which may overlap. For example, in FIG. 2a, the user may have designated one of the doors as the foreground region. Or, the user may have designated the combination of the floor and the chair as the foreground region.

In a method for identifying the foreground region 202 in the digital image 200, the user can select, using a graphical interface device (or brush) 207, boundary 210 (shown in FIG. 2b) in the digital image 200 that encompasses or traces the chair and then designates the chair as the foreground region 202. The graphical interface device is a mechanism that enables the user to indicate or "paint" the boundary, much like a brush is used by a painter.

Boundary 210 bounds the chair and can also include portions of other objects. For example, boundary 210 may include portions of a door or the floor if the user wants to include those objects in the foreground region. FIG. 2b shows a highlighted portion of the boundary of the chair.

Defining a boundary 210 that only encompasses the chair can be difficult. For example, the user can trace with a relatively larger brush around the top of the chair, but a relatively smaller brush is required near the wheels and the arm rests. The user may select different sized brushes depending on the region that will be traced. However, in order to ensure that the region to be highlighted actually covers the boundary to be traced, a larger brush is typically selected. Moreover, even when the user traces with a relatively narrower brush around the wheels and arm rests, the narrow brush may still cover many features of the chair and the background region.

In addition to being time consuming, tracing along the boundary won't resolve how much of the pixel color for a pixel in the boundary came from the object (for example, the chair) and how much came from the background region. The process of characterizing individual pixels in the boundary is difficult because their data is a blend of both the object data and the background region data.

A portion or object of a digital image may be identified for further processing using an identification or selection operation. An example of such operation is a masking operation in which an object in a digital image is cut so that the object can be manipulated (for example, blended into another region or otherwise manipulated). Masking typically includes defining an opacity (conventionally represented by alpha α) for pixels in the masked and unmasked regions, where the opacity specifies the degree to which an associated pixel is selected (for example, identified or masked). A value of 1 can be used to indicate that the pixel belongs completely to the object or foreground region. A value of 0 can be used to indicate that the pixel belongs completely to the background region. Values between 0 and 1 indicate partial membership in both.

Referring also to the digital image of FIG. 3a, a foreground region 202 including the chair can be masked from the background region by clicking on the chair using a cursor 300. A masking technique is described in "IDENTIFYING INTRINSIC PIXEL COLORS IN A REGION OF UNCERTAIN PIXELS," application No. 09/298,872, filed Apr. 26, 1999, which is incorporated herein by reference. In that technique, a linear blend model for a particular pixel is determined by, roughly, observing a color cf of a pixel in the foreground region closest to the particular pixel and a color cb of a pixel in the background region closest to the particular pixel. An opacity α for the particular pixel with color c is determined using a computation in color space that chooses $0<\alpha<1$ so that c is as close as possible to the opacity found using the linear blend model described by $\alpha \times cf+(1-\alpha) \times cb$.

FIG. 3b shows the result of a masking operation in which the chair has been masked from the digital image 200. All pixels in the background region 204 are assigned an opacity value of 0 whereas all pixels in the foreground region 202 are assigned an opacity value of 1. Pixels lying between the clearly distinguished regions may have opacity values between 0 and 1 that are based on the linear blend model technique discussed above.

The color-based detection technique described above and shown in FIGS. 2b, 3a, and 3b may make incorrect decisions about those pixels lying between the clearly distinguished regions if the foreground and background region colors are similar. For example, in FIG. 3b, the color-based technique has difficulty discerning an appropriate value for the opacity of some pixels that are clearly in the background region (for example, the pixels in the door frames). Thus, for example, pixels in region 305 were given opacity values near to 1 even though the pixels in that region are clearly in the background region (that is, in the rear window area). As another example, the color-based technique incorrectly assigns portions of the dark carpet triangles as belonging to the foreground region or chair (as shown in region 310). In contrast, the color-based technique incorrectly assigns portions of the dark left arm of the chair (region 315) as belonging to the background region as evidenced by the holes in the left arm of the chair. This problem occurs because the chair's left arm overlaps some black trim on the wall behind the chair and it is difficult for the color-based technique to distinguish the chair's black color from the background's black color.

In addition to masking an object, the intrinsic color of each pixel in the image may be determined in a process referred to as color decontamination. Each pixel has associated with it an intrinsic color, which is the color of the pixel in the image if the pixel were not blended with the background region. The intrinsic color may differ from the observed color because regions of the digital image may be blended. The blending can arise either from imaging optics in the process of capturing a digital image or from the composition of multiple image layers. Blends can arise from "color spill," in which light from one portion of a scene reflects to another. For pixels that are not blended, the intrinsic color is the observed color. For pixels that are blended, (including blending due to color spill) the intrinsic color is a color that differs from the observed color. After the object is masked and the intrinsic colors of pixels in the object are determined, the object has been color extracted.

The masked object may be blended with another background region in a process referred to as compositing. When the masked object is blended with the other background region, a resultant image is produced including pixels having values derived from the blending of the object with the other background region. In the composition process, opacity values for the masked object are used to determine the blend. Where the opacity values are 0, pixel data is derived from the other background region and where the opacity values are 1, pixel data is derived from the masked object.

Traditional masking techniques work best when the user manually specifies a width that describes the boundary; thus, no automation is provided. Some masking techniques determine a background region color by requiring the user to position the center of the brush (referred to as a brush tip) in the background region.

Often, poor results have been obtained in previous masking techniques because the size of the user's brush may be too large or too wide, which can cause it to cross or intersect another boundary of the image. Poor results in previous masking techniques may also occur when the boundary is near to or coincident with fine texture or when foreground and background region colors are similar, as discussed above.

SUMMARY

In one aspect, a border is identified in a digital image defined by a plurality of pixels, each pixel being defined by a pixel color and a pixel position indicating a location of the pixel in the digital image. User inputs are received that include an area of interest that includes at least a portion of the border to be identified. Identification of the border includes estimating information about an edge zone that models the border portion including estimating a position and width of the edge zone. The position of the edge zone is estimated by calculating a weighted average value of pixel positions of each pixel in the area of interest. A measure of confidence in the edge zone information is calculated. A width of the edge zone is estimated at which the calculated measure of confidence decreases appreciably if the estimated edge zone width increases. The border is identified based on the estimated edge zone information.

Aspects of the method may include one or more of the following features. For example, receiving the area of interest may include receiving a user input indicating the area of interest. The weighted average value of pixel positions may be calculated by weighting each position of a pixel in the area of interest by a first function of a gradient magnitude at the pixel. The weighted average value of pixel positions may be calculated by weighting each position of a pixel in the area of interest by a second function that is a difference between the pixel gradient direction and a predetermined bias direction.

The bias direction may be a previously estimated edge zone direction. The bias direction may be derived by comparing a location of a previous area of interest to the area of interest.

Identification of the border may include receiving, for each pixel, a pixel gradient indicating a direction and magnitude of change in color.

Estimating the weighted average value of pixel positions may include estimating a center of the area of interest and weighting each pixel position in the area of interest by a third function. The third function is a difference between the pixel position and the estimated center of the area of interest. The area of interest center may be estimated by accessing a previously estimated edge zone position.

Receiving the area of interest may include receiving information relating to the area of interest through a user controlled graphical interface device. Moreover, estimating the center of the area of interest may include estimating one or more local maxima of a function of the gradients along a path that intersects the graphical interface device and lies parallel to a predetermined direction relating to the edge zone.

The predetermined direction relating to the edge zone may be a previously estimated normal direction of the border.

A local maximum may be selected by finding a distance between the local maximum and a previously estimated edge zone position, and calculating a gradient value of the pixels that are crossed along a path connecting the previously estimated edge zone position and the local maximum. A local maximum may be selected by calculating an average (per pixel) amount of agreement in gradient angle with the predetermined direction relating to the border along a path connecting the previously estimated edge zone position and the local maximum. A local maximum may be selected using any one or more of the above described methods in addition to using other gradient magnitude- and gradient direction-based criteria that seek to identify a candidate that lies along the same border as a previously estimated edge zone position.

Information about the edge zone may be estimated by estimating a direction of the edge zone to calculate a weighted average value of pixel gradient directions at each pixel in the area of interest. The measure of confidence in the edge zone information may be calculated by calculating an average value of a difference between the estimated edge zone direction and the pixel gradient direction at each pixel over an estimated edge zone area.

Identifying the border may include comparing the position of a pixel in the area of interest to the estimated edge zone position to determine a relative position of the pixel, and calculating an opacity for a pixel in the area of interest based on the relative position. The position of the pixel in the area of interest may be compared to the estimated edge zone position along the estimated edge zone direction. The opacity may be calculated by calculating a value based on the comparison and the estimated edge zone width.

Identification of the border may include receiving one or more other areas of interest. Each of the one or more other areas of interest includes at least a portion of the border to be identified. For each of the one or more other areas of interest, a position of an edge zone may be estimated by calculating a weighted average value of pixel positions of each pixel in the other area of interest. Moreover, a direction of the edge zone for the other area of interest may be estimated by calculating a weighted average value of gradient directions at each pixel in the other area of interest. A width of the edge zone for the other area of interest may be estimated. Accordingly, a measure of confidence in the edge zone direction, position, and width for the other area of interest may be calculated. Additionally, identification of the border may include estimating a width of the edge zone at which the calculated measure of confidence decreases appreciably if the estimated edge zone width increases. An opacity for a pixel in the other area of interest may be calculated by comparing the position of the pixel in the other area of interest to the estimated edge zone position for the other area of interest.

Identification of the border may also include analyzing the calculated measures of confidence for those areas of interest in which a pixel is included and calculating a border-derived opacity for the pixel based on the analyzed measures of confidence. The calculated measures of confidence may be analyzed by calculating a measure of confidence that corresponds to an acceptable measure of confidence. Calculating the border-derived opacity may include selecting an opacity corresponding to an acceptable measure of confidence.

Calculating the border-derived opacity may include calculating a weighted average value for the opacities for each pixel by weighting each opacity by the corresponding calculated measure of confidence. The border-derived opacity may be calculated by selecting an opacity corresponding to a most recently calculated opacity for a given pixel.

Identification of the border may also include masking a region of the digital image by receiving input from a user indicating a region to mask. The masking may include calculating a second opacity for a pixel, comparing the border-derived opacity to the second opacity, and calculating a final opacity for the given pixel by analyzing the comparison. The second opacity for the pixel is calculated using a color space computation based on a linear blend model. Calculating the final opacity may include analyzing one or more of the measures of confidence in the areas of interest in which the pixel is included.

Calculating the final opacity may include estimating an error in calculating the border-derived opacity, estimating an error in calculating the second opacity, and selecting as the final opacity the border-derived opacity, the second opacity, or a composite opacity based on the estimated errors. The composite opacity depends on the border-derived opacity and the second opacity.

Identification of the border may also include automatically indicating to a user the estimated edge zone information. The user may be enabled to identify the area of interest using the indicated edge zone information. The method may also include automatically indicating to the user the estimated edge zone position, the estimated edge zone direction, the estimated edge zone width, or the calculated measure of confidence.

The method may include receiving as an input another area of interest that includes at least a portion of the border to be identified. The portion is modeled by another edge zone. Identification of the border may include combining the edge zone with the other edge zone.

A position, direction, and width of the other edge zone may be estimated. Estimating the position of the other edge zone may include calculating a weighted average value of pixel positions of each pixel in the other area of interest. Estimating the direction of the other edge zone may include calculating a weighted average value of gradient directions at each pixel in the other area of interest. A measure of confidence in the direction, position, and width of the other edge zone may be calculated. A width of the other edge zone may be estimated to be that estimated other edge zone width at which the calculated measure of confidence decreases appreciably if the estimated other edge zone width increases.

The border may include one or more pixels along a direction that is normal to a general direction of the border.

For example, the border may be one pixel wide or the border may be multiple-pixels wide.

Aspects of the methods and systems described herein can include one or more of the following advantages. For example, the techniques described here allow applications to detect and use borders to extract and/or mask an object from a digital image. In general, the detection methods permit a user to easily and accurately mark a border of an object by snapping a brush tool (which is a cursor indication within a graphical user interface) to a border center and by establishing a width of the border at the brush tool. Because of this, less highlighted region is applied with the brush tool relative to the size of the brush tool. Such ease and accuracy improves results of known masking techniques. Moreover, the techniques provide reliable estimates of foreground and background region color mixtures by fitting a border profile along a normal direction of the border across the border width. The techniques also greatly reduce extraneous pixels in the background region and/or fill in the pixel holes in the foreground region that occur in known color-based techniques. Such unwanted effects such as extraneous pixels in the background region or pixel holes in the foreground region may be present when texture is very near to the border and/or when the foreground and background region colors are similar.

Other advantages and features will become apparent from the following description and from the claims.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 14b is a graph indicating the second area center candidates in FIG. 14a.

FIGS. 17, 19, 20, 22, and 23 are flow charts of processes for masking a foreground object from a digital image based on the determined border in FIG. 4.

DETAILED DESCRIPTION

Figure 4:
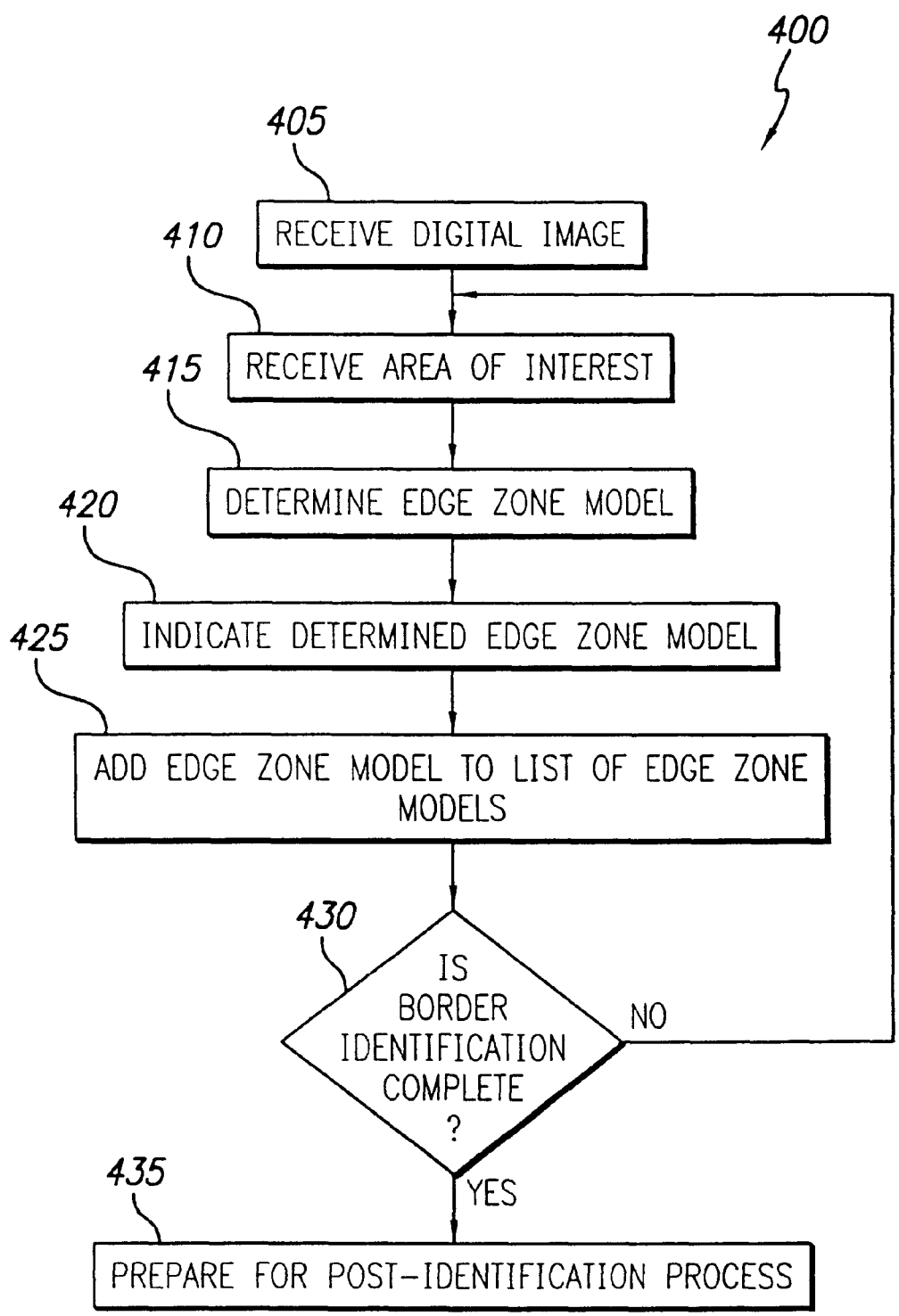
FIG. 4 is a flow chart of a process for modeling a border in a digital image.

FIG. 4 is a flow chart showing a process 400 for identifying or modeling a border in a digital image. The process can be used as part of an extraction process, or other image manipulation such as a masking process that uses extraction. One or more processors can execute the process that each may execute instructions accessed from a local and/or remote memory. The processors can be coupled to various input/output devices such as, for example, a display, keyboard, or mouse. The processors may also be coupled to an input/output interface that receives and transmits data over communication links. Such communication links include, by way of example, a serial link, local area network, wireless link, and parallel link.

A border is a region in which a foreground region (which often corresponds to one or more objects) meets a background region (which is any region in the digital image not part of the foreground region). In the border, colors in the foreground region and colors in the background region are mixed. The border includes pixels having blended data, that is, data associated with the foreground region are blended with data associated with the background region (or other intersecting object). Generally, the border may be one or more pixels wide.

A border may be segmented into one or more possibly overlapping edge zones; each edge zone being a segment of the border that touches both the pixels in the foreground region that are adjacent to the border and the pixels in the background region that are adjacent to the border. Edge zones, which are amenable to analysis, provide pieces of the border. The border is assembled from the edge zones. Colors of pixels in an edge zone may, for example, be area averages with contributions from colors of pixels in the foreground and background regions. Pixels lying in the edge zone for a red object against a blue background might be purple because an image formation process may average the red and blue light that arrived at a camera sensor area.

Border determination may further include analyzing a minimum scale that a user is willing to examine while trying to specify the border. For example, the user may attempt to define a border around a fuzzy object such as the back of a cat that has many tiny hairs. An inner portion of the border may lie completely within the region that is all hair, which is within the foreground region, and be roughly parallel to the cat's back. In contrast, an outer portion of the border may lie completely within a background region that meets the fuzzy object and be roughly parallel to the cat's back. In this case, there are pixels within the border that are entirely within the foreground or within the background as well as pixels that are blended between the foreground and background. However, at the scale of interest to the user, all pixels are within the border.

The process begins by identifying a digital image for processing (405). For example, the processor can receive the digital image through any of the various input/output devices or communication links. In one implementation, a digital photograph is downloaded from a digital camera onto a local memory that is accessible by the processor.

Figure 2A:
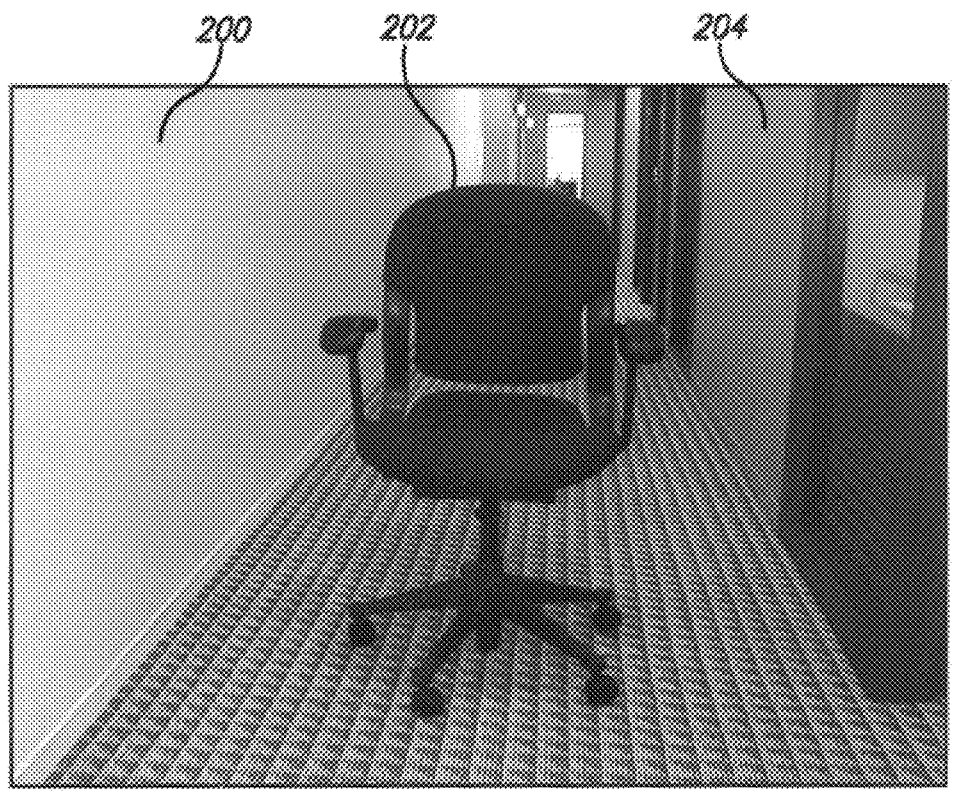
FIG. 2a shows a digital image that includes a chair.

A user designates or identifies an area of interest (denoted B) that includes at least a portion of the border and that generally follows the border (step 410). In the example of FIG. 2a, the user selected the area of interest by following the border between the foreground region 202 and the background region 204. The user may designate the area of interest using a graphical interface device such as a brush tool or cursor. By convention, the graphical interface device may be referred to as a brush.

Figure 5:
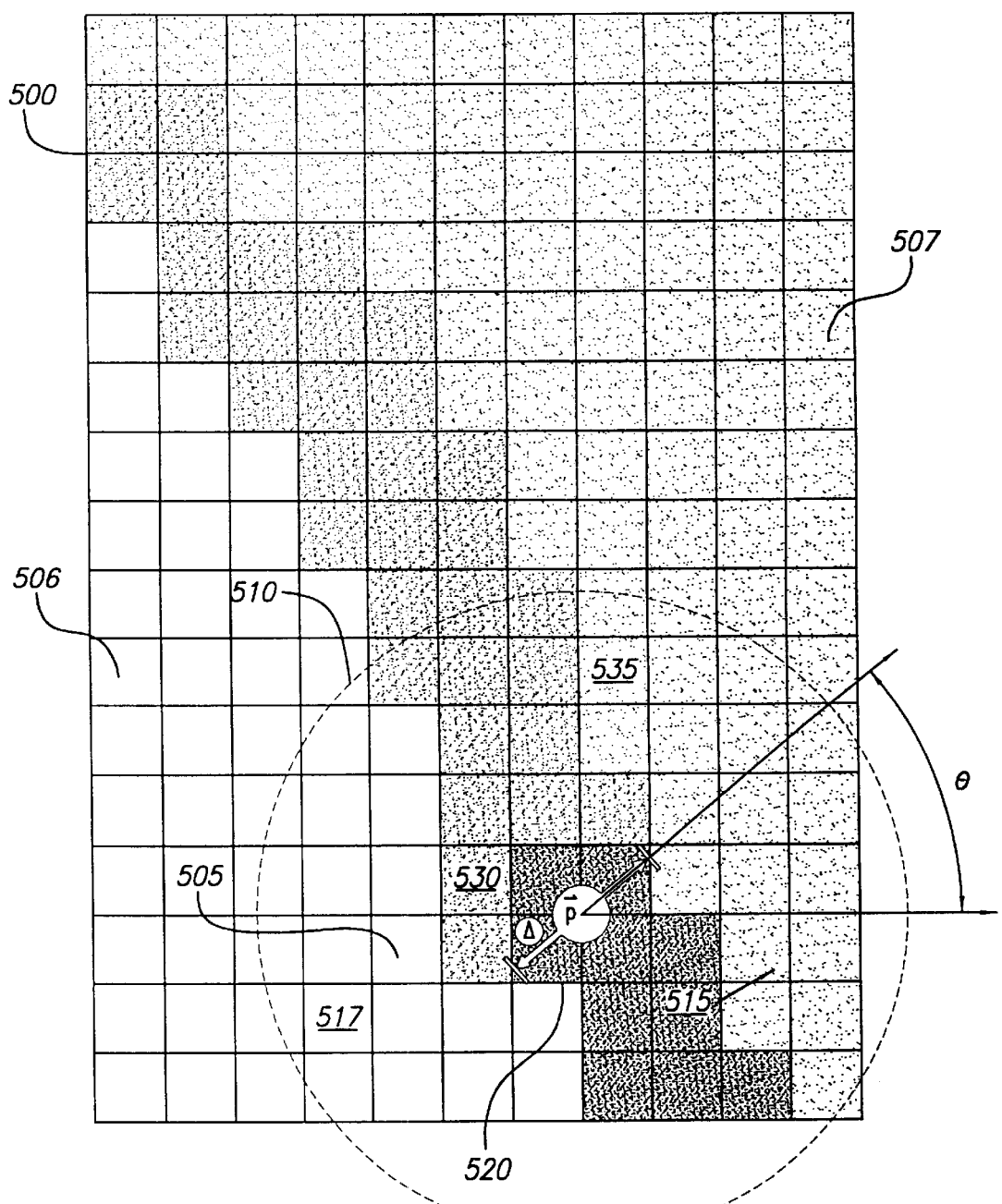
FIGS. 5 and 6 show a portion of a digital image in which a user has selected an area of interest that includes at least a portion of a border using a graphical interface device.

Referring to FIG. 5 in which a portion 500 of a digital image is shown, the user has indicated an area of interest 505 between an object 506 and a background region 507 using the brush 510. Although a brush of a certain length or size is displayed in FIG. 5 (for example, a circle with a diameter of nine pixels), the actual size of the brush may vary, depending on user settings. Likewise, the distance between the centers of consecutive areas of interest may vary depending on a rate at which the user traces the border and/or other predetermined parameters that may be controlled by the user. For example, processing speed may affect the distance between the centers of consecutive areas of interest. The brush 510 in FIG. 5 is displayed with dotted lines to indicate that it is transparent to the underlying digital image, that is, the user is able to view the underlying digital image.

Before beginning the border identification (or during border identification), the user can select an area of interest size that facilitates border identification. Thus, for example, the user may select an area of interest size that encompasses the border but also allows the user to easily trace the border at a reasonable rate.

The process then determines an edge zone model, that is, a model that describes the portion of the border indicated by the area of interest (step 415). In this step, the process determines an edge zone model in view of two competing goals: first, the edge zone model should describe or span the entire edge zone; second, the edge zone model should exclude unwanted edge zones or portions of the foreground or background regions.

After the edge zone model is determined, the process indicates to the user the determined edge zone model by highlighting the edge zone model (step 420). Referring to FIG. 5, for example, the processor indicates the edge zone model 520 corresponding to the received area of interest 505 by highlighting (shown in black ink) edge zone model 520.

After determining the edge zone model, the edge zone model $M_B$ is added to a list L of all edge zone models: {L}={L}+$M_B$. (step 425). When complete, the list L of all edge zone models describes or summarizes the border. The process determines whether border identification is complete (step 430). In one implementation, border identification is complete when the user has traced the complete border.

Each edge zone model $M_B$ has associated with it a set of pixels {P1, P2, ..., Pn} that fall within that particular edge zone model. Some pixels may fall within more than a single edge zone model—thus, there exists a set of edge zone models {$M_B 1, M_B 2, \ldots, M_B k$} associated with a particular pixel P.

Figure 2B:
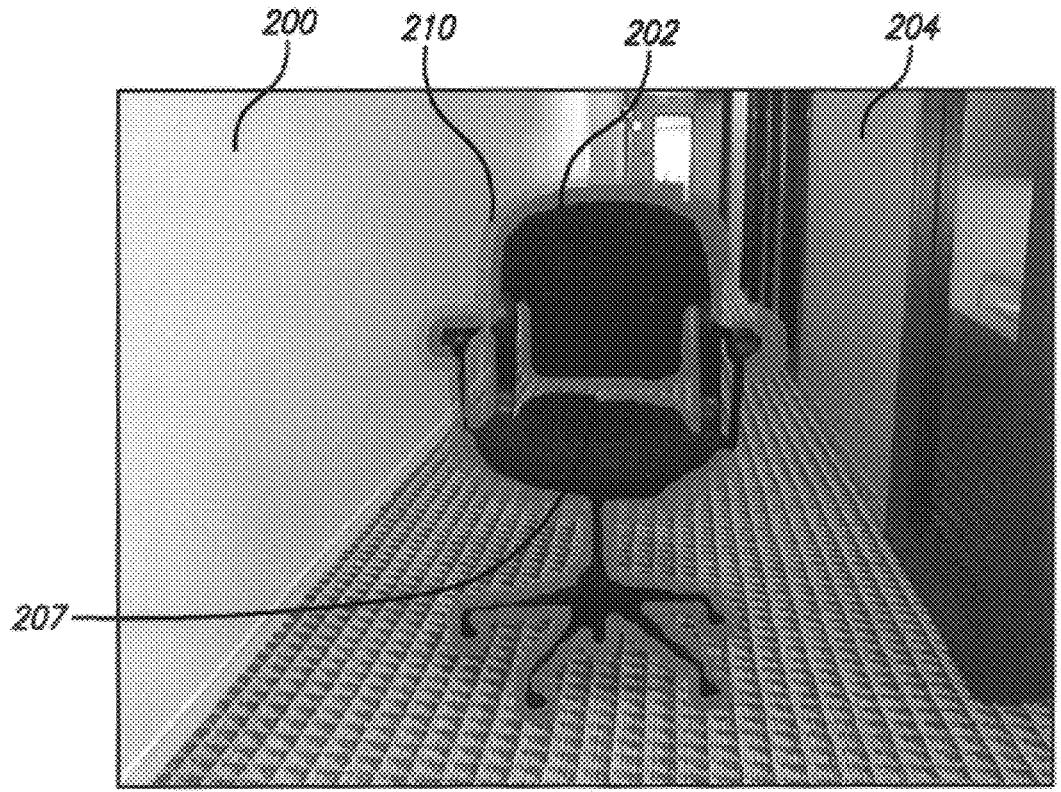
FIG. 2b shows the digital image of FIG. 2a in which the user has highlighted a boundary of the chair using a color-based technique.

In another implementation, identification of the border is complete when a direct input is received from the user. For example, the user may select a "trace complete" button in an interface that indicates to the processor or processors performing the process that the user has finished the tracing. For a closed border (such as the chair's border 210 of FIG. 2b), the process may, for example, determine that border identification is complete when the user begins to trace over an already determined edge zone model. Or, for an open border, the processor or processors performing the process may determine that border identification is complete when the user approaches a particular location of the digital image (for example, an end of the page). Alternatively, the process may determine that border identification is complete when the processor or processor performing the process fails to receive a next area of interest within a predetermined period of time.

Figure 6:
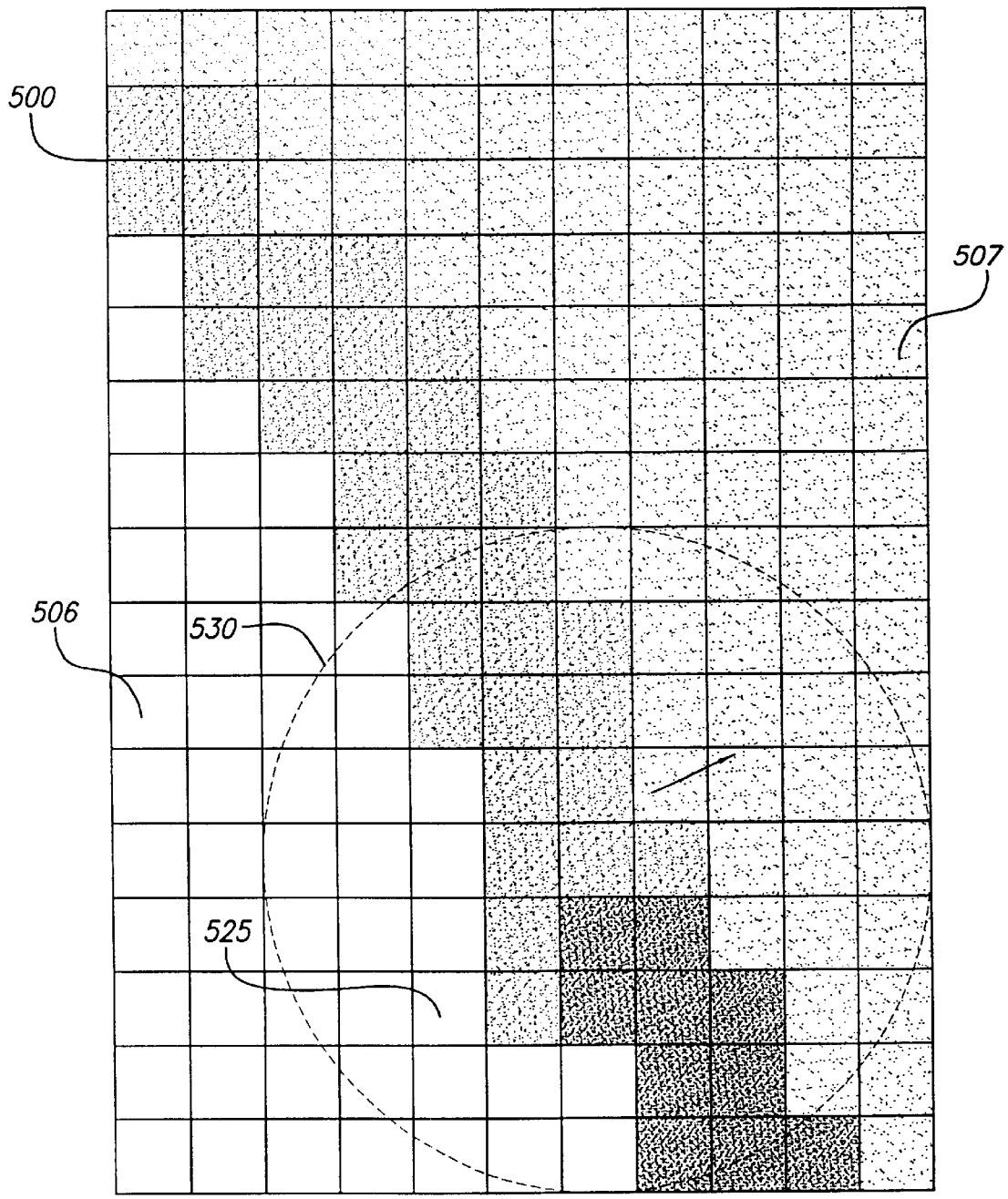

If border identification is not complete (step 430), the next area of interest is identified (step 410). For example, as shown in FIG. 6, the user has continued tracing along the border and has indicated a next area of interest 525 as indicated by brush 530. If border identification is complete (step 430), the process prepares the data that models the border for a post-identification process (step 435) that may include, by way of example, masking of an object bound by the border and/or compositing of the masked object with another image. Preparation of the border data may simply include storing the border data into a local or remote memory that may be accessed at a later time by a post-identification process.

Determine Edge Zone Model (Step 415)

Figure 7:
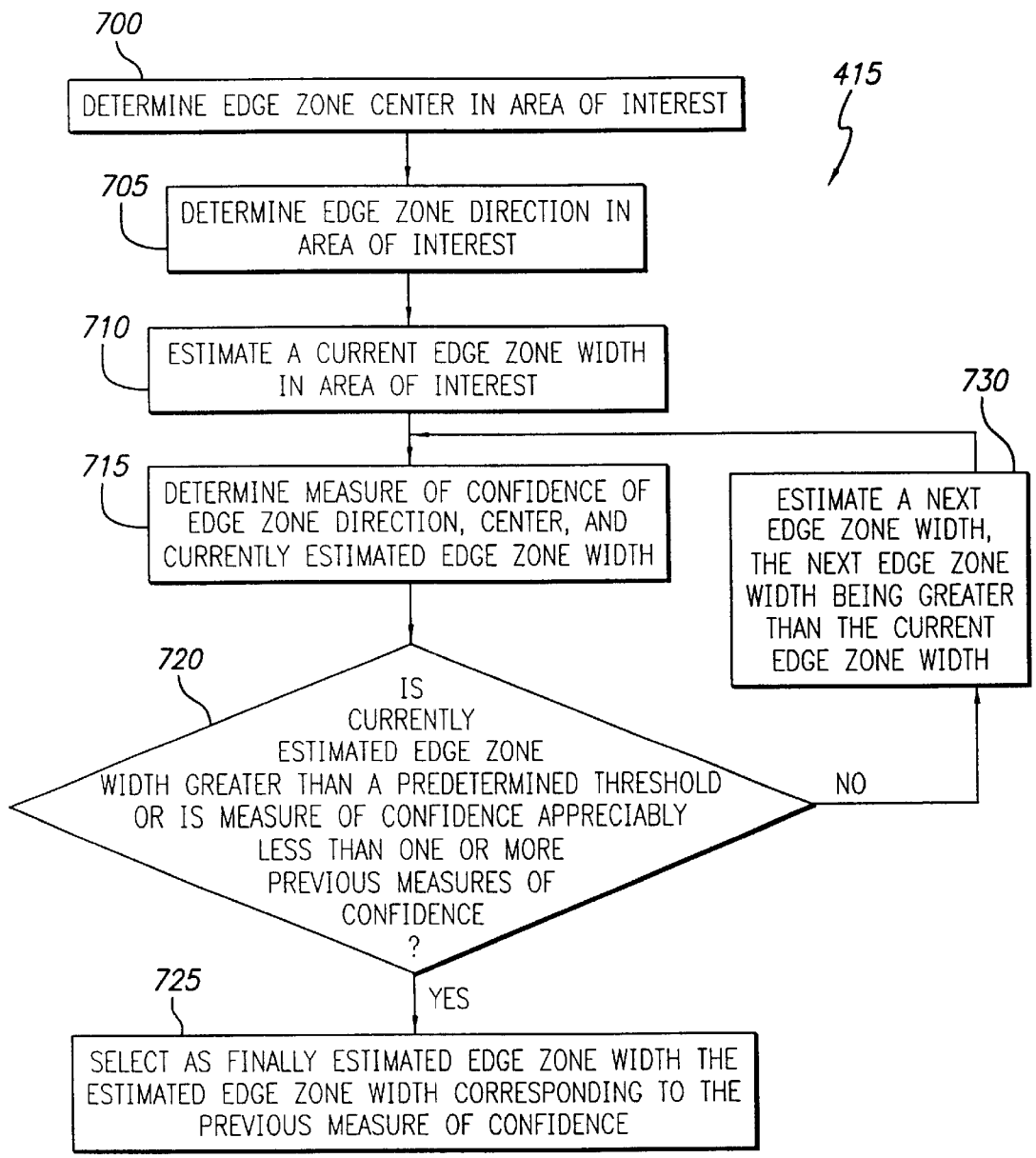
FIG. 7 is a flow chart of a process for determining a portion of the border (called an edge zone) in the selected area of interest.

Referring also to FIG. 7, the edge zone model is identified according to a process 415. Identification of the edge zone model includes determining an edge zone position (denoted $\vec{p} = (p_x, p_y)$), an edge zone direction (denoted $\theta$), an edge zone width (denoted $\Delta$), and a measure of confidence (denoted $\chi$) in the identification of the edge zone model. The edge zone direction may be designated as a direction perpendicular to a tangent of the border. An identified edge zone model $M_B$ for a particular area of interest B is given by [$\vec{p}$, $\theta$, $\Delta$, $_{102}]_B$. Referring again to FIG. 5, for example, the position $\vec{p}$, width $\Delta$, and direction $\theta$ are shown for edge zone model 520.

Figure 8:
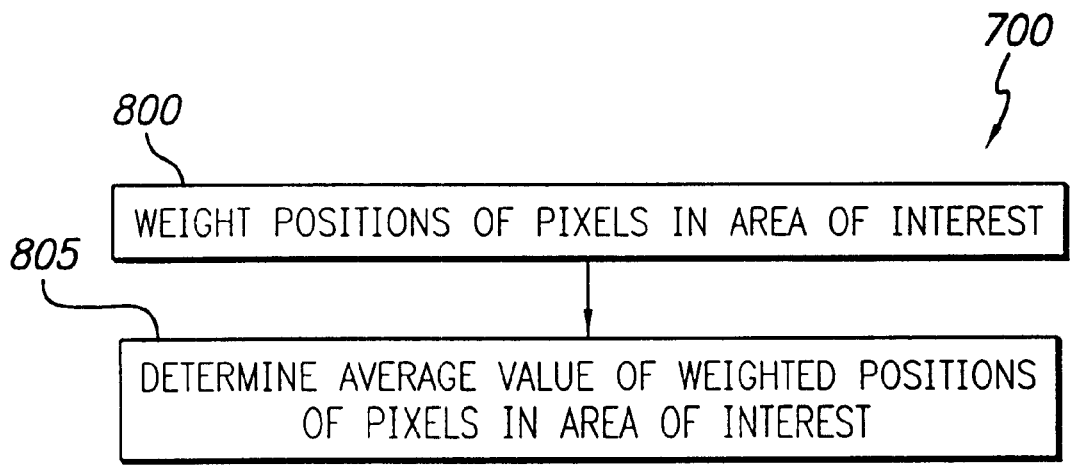
FIGS. 8 and 9 are flow charts of a process for determining the edge zone model position and direction.

The process 415 determines the position of the edge zone (step 700) by computing a weighted average of pixel positions over the pixels within the area of interest B. Referring to FIG. 8, the process 700 first weights the positions $\vec{r}$ of pixels in the area of interest by a weight W($\vec{r}$), (step 800). Thus, for each pixel in B, the process 700 determines W($\vec{r}$)×$\vec{r}$. Then, the process 700 includes calculating an average value of pixel positions weighted by W($\vec{r}$), over all pixels for which $\vec{r}$ is in the area of interest B (step 805):

$$\vec{p} = \frac{\sum_{\vec{r} \in B} W(\vec{r}) \times \vec{r}}{\sum_{\vec{r} \in B} W(\vec{r})}, \quad (1)$$

where the sum is over all pixels for which $\vec{r}$ is in area of interest B.

Figure 9:
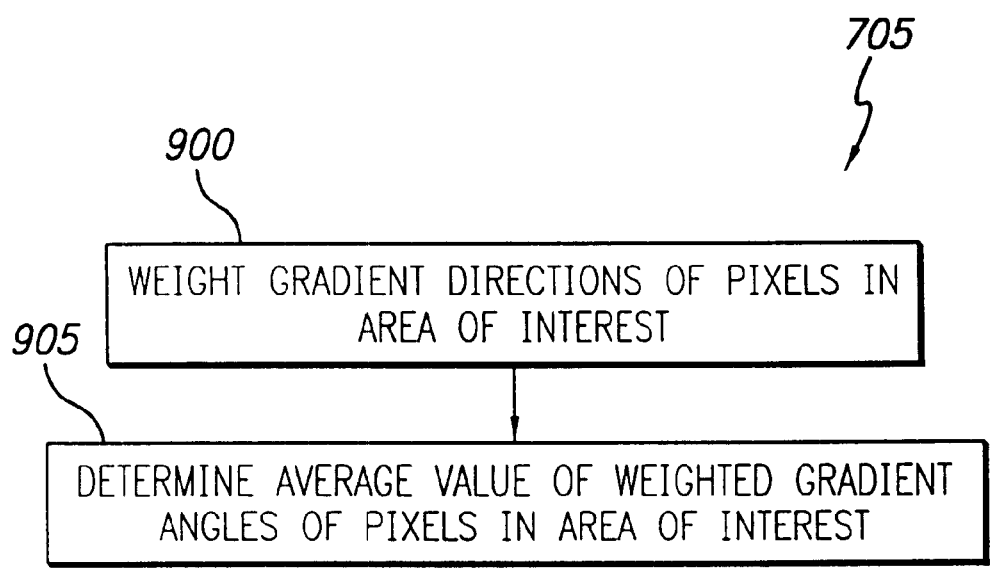

The process 415 includes determining the direction of the edge zone (step 705) by computing a weighted average of gradient angles over pixels within the area of interest. Referring to FIG. 9, the process 705 first weights the gradient angles, $\omega(\vec{r})$, at pixels in the area of interest by the weight $W(\vec{r})$ (step 900). Thus, for each pixel in B, the process 705 determines $W(\vec{r}) \times \omega(\vec{r})$. Then, the process 705 calculates an average value of pixel gradient directions weighted by $W(\vec{r})$ over all pixels for which $\vec{r}$ is in the area of interest B (step 905):

$$\theta = \frac{\sum_{\vec{r} \in B} W(\vec{r}) \times \omega(\vec{r})}{\sum_{\vec{r} \in B} W(\vec{r})}. \quad (2)$$

The weight $W(\vec{r})$ may include one or more of an increasing function $W_1$ of that pixel's gradient magnitude, a decreasing function $W_2$ of a difference between a predetermined bias direction $\Theta_{bias}$ (that is determined, for example, according to the previously computed edge zone direction and/or the user's movement of the interface device along the border) and the pixel gradient angle, and a decreasing function $W_3$ of a difference between the pixel position and the center of the area of interest. Each of these weight terms may be written in mathematical form as:

$$W_1 = F_1(|\vec{G}(\vec{r}3)|); \text{tm} \quad (3)$$

$$W_2 = F_2(\Theta_{bias} - \omega(\vec{r})); \text{ and} \quad (4)$$

$$W_3 = F_3(|\vec{r} - \vec{C}(B)|), \quad (5)$$

where $\vec{C}(B)$ is the center of the area of interest B. For example, $W_1$ may be $|\vec{G}(\vec{r})|^2$, $W_2$ may be $\cos^2(\Theta_{bias} - \omega(\vec{r}))$, and $W_3$ may be $|\vec{r} - \vec{C}(B)|^{-2}$. Other possible functions include $W_1 = |\vec{G}(\vec{r})|$ or $W_3 = |\vec{r} - \vec{C}(B)|^{-1}$. The function $W_2$ may depend on the smaller of the angles between $\Theta_{bias}$ and $\omega(\vec{r})$, which may be $[\pi - (\Theta_{bias} - \omega(\vec{r}))]$ if $\pi/2 < (\Theta_{bias} - \omega(\vec{r})) < \pi$ or simply $\Theta_{bias} - \omega(\vec{r})$ if $0 < (\Theta_{bias} - \omega(\vec{r})) < \pi/2$. The weight $W(\vec{r})$ for a pixel in area of interest B may include any combination of these terms, for example, the weight may be written as: $W(\vec{r}) = W_1 \times W_2 \times W_3$, $W(\vec{r}) = W_1 \times W_2$, or $W(\vec{r}) = W_1$.

If the weight $W(\vec{r})$ includes the term $W_1$, then those pixels with a greater gradient magnitude have a greater contribution to the average values. In this example, pixels with a greater gradient magnitude have a greater contribution to the computed edge zone position and direction. Referring again to FIG. 5, for example, pixel 515, which has a gradient vector of non-zero magnitude as indicated by the arrow, would contribute to the calculation of the edge zone direction and position. On the other hand, pixel 517, which has a gradient vector of zero magnitude, would not contribute to the calculation of the edge zone direction and position. This weight term helps negate or reduce the effects of distracting borders that are not as strong as the border that the user is tracing.

If the weight includes the term $W_2$, then those pixels for which the gradient angle is relatively nearer the predetermined bias direction have a greater contribution to the computed edge zone position and direction. The predetermined bias direction may be a direction of a previously determined edge zone model. The predetermined bias direction may be related to the direction that the brush travels across the areas of interest. Referring again to FIG. 6, one predetermined bias direction that may be used to determine the edge zone model for the area of interest 525 is the previously determined edge zone direction $\Theta$ shown in FIG. 5. In this example, those pixels (in area of interest 525) for which the gradient angle is nearer the direction $\Theta$ have a greater contribution to the determination of the edge zone position and direction than those pixels (in area of interest 525) for which the gradient angle is far from the direction $\Theta$.

A weight that depends on a predetermined bias direction serves to reduce the effect of distracting borders that do not follow the direction of the targeted border. For example, if the user is tracing along a first border at the intersection between the first border and a second border, then the processor performing the process 400 may have some difficulty distinguishing between the first and second borders. Thus, if the gradient angle at a pixel disagrees with the predetermined bias direction, which may occur because a distracting border traverses that pixel, then that pixel's information would contribute relatively less to the edge zone position and direction.

If the weight includes the weight term $W_3$, then those pixels whose position is nearer to the center of the area of interest have a greater contribution to the computed edge zone position and direction. Because pixels in distracting borders away from the center of the area of interest could exhibit significant gradient magnitudes, this weight term reduces the effect of pixels in such distracting borders because, presumably, these pixels would typically be located farther away from the center of the area of interest. The weight term $W_3$ is included in the weight when there is a reasonable expectation that the user will trace along the border of interest. Referring again to FIG. 5, pixel 530 is nearer to the center of the area of interest 505 than pixel 535, and therefore, in this example, pixel 530 would have a greater contribution to the edge zone position and direction calculation than pixel 535.

Using the determined edge zone position $\vec{p}$ (step 700) and edge zone direction $\theta$ (step 705), the processor performing the process 415 estimates an edge zone width $\Delta_h$ (step 7 710). Then, the process includes determining a measure of confidence $\chi$ of the current edge zone that includes the estimated edge zone position, direction and current estimated width $\Delta_h$ in the area of interest (step 715). By convention, the higher the confidence in the edge zone model, the greater the measure of confidence. Using the estimated edge zone width $\Delta_h$, the measure of confidence can be defined as the average deviation of the pixel gradient angle $\omega(\vec{r})$ from the edge zone direction $\theta$ over an estimated edge zone region (denoted by $\epsilon$):

$$\chi = \frac{\int_{\vec{r}\in\varepsilon} F_4(\theta - \omega(\vec{r})) \times \begin{Bmatrix} 1 & \text{if } |\vec{G}(\vec{r})| \geq \tau_1 \\ 0 & \text{otherwise} \end{Bmatrix}}{\text{size of } \varepsilon}, \quad (6)$$

where $F_4$ is a decreasing function, $\tau_1$ is a predetermined threshold of the pixel gradient magnitude, and the estimated edge zone region is $\varepsilon$ region centered at the edge zone position $\vec{p}$ with a width given by the estimated edge zone width $\Delta_h$. The predetermined threshold $\tau_1$ may be around 5 for color levels ranging from 0 to 255. Examples of $F_4$ include $\cos^2(\theta - \omega(\vec{r}))$ and $$\begin{Bmatrix} 1 & \text{if } \cos^2(\theta - \omega(\vec{r})) \geq \tau_2 \\ 0 & \text{otherwise} \end{Bmatrix},$$

where $\tau_2$ is a predetermined threshold. The predetermined threshold $\tau_2$ may be around $\cos^2(15°)$ which is around 0.933. Thus, the measure of confidence depends on the estimated width of the edge zone.

The processor performing the process 415 determines whether the measure of confidence $\chi$ for the current edge zone model is appreciably less than one or more previous measures of confidence; that is, a measure of confidence for the previous edge zone model that includes a previously estimated edge zone width (step 720). Step 720 may also include determining whether the current estimated edge zone width is greater than a predetermined size to ensure that a finally estimated edge zone width remains within a reasonable value.

If the current measure of confidence is appreciably less than the previous measure of confidence, the previously estimated edge zone width is selected as the finally estimated edge zone width (step 725). Otherwise, the process 415 includes estimating a next edge zone width in the area of interest that is larger than the current edge zone width (step 730). Initially, the process may include estimating a predetermined minimum edge zone width.

Figure 10A:
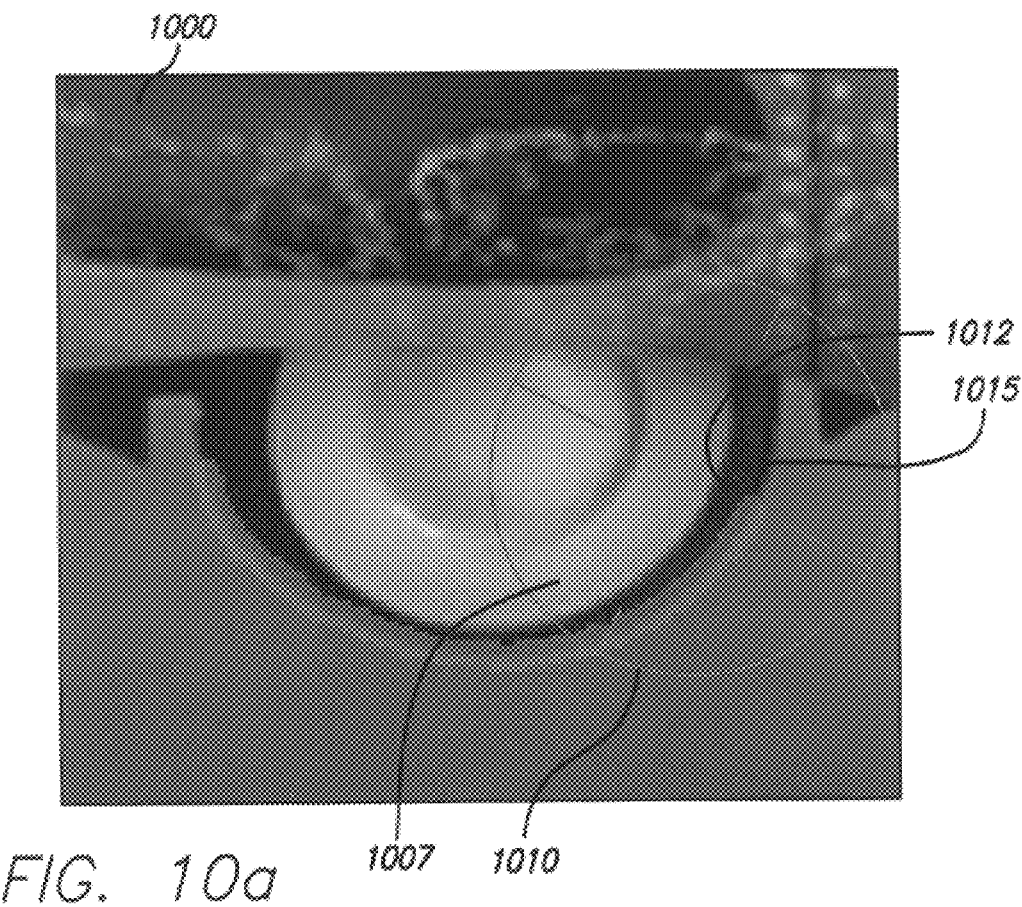
FIGS. 10a and 10b show a digital image in which an edge zone model of the user-traced border is estimated using the processes of FIGS. 4 and 7–9.
Figure 10B:
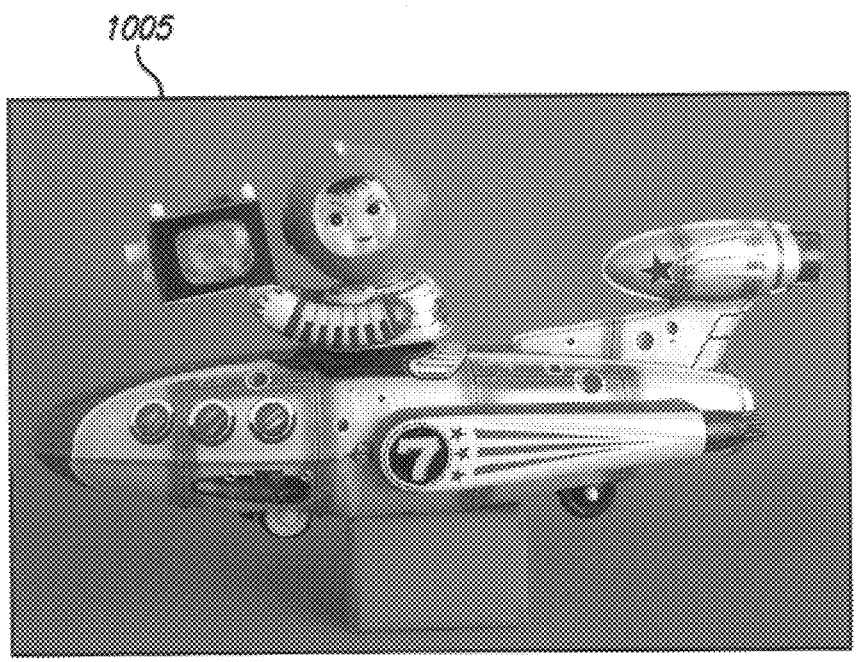

Even though the weight $W(\vec{r})$ includes a combination of the terms $W_1$, $W_2$, and $W_3$, problems may arise due to distracting borders in the image. Referring also to a portion 1000 of an image 1005 as shown in FIGS. 10a and 10b, for example, there may be borders (for example, border 1012) within the area of interest 1007 defined by brush 1010 that are parallel to a border 1015 that is traced by the user. In image 1005, the user is tracing along the outer border 1015 of the front left wheel of the rocket in shown in FIG. 10b. In this case, the weight $W_2$ may not sufficiently reduce the effect of border 1012 in determining the edge zone position and direction in area of interest 1007.

Often, another problem may arise because the user may get careless at some point during the border tracing. For example, in FIG. 10a, the user has begun to carelessly trace over the inner black-yellow border 1012 even though the user wants to trace over the outer black-green border 1015. In this case, the weight $W_3$, which penalizes those pixels, which are farther away from a center of area of interest 1007, may not sufficiently reduce the effect of the border 1012 in determining the edge zone position and direction in area of interest 1007.

Additionally, the user may want to trace a border, which exhibits a weaker gradient than that of nearby borders within the area of interest. For example, in FIG. 10a, the user is tracing border 1015 that has a weaker color gradient between the background region (dark green) and the background region (black) in comparison to the border 1012 which has a stronger color gradient between the foreground region (yellow) and the background region (black). In this case, the weight $W_1$, which penalizes those pixels which exhibit a weaker color gradient (for example, pixels along border 1015), may not sufficiently reduce the effect of the border 1012 in determining the edge zone position and direction in area of interest 1007.

Figure 11:
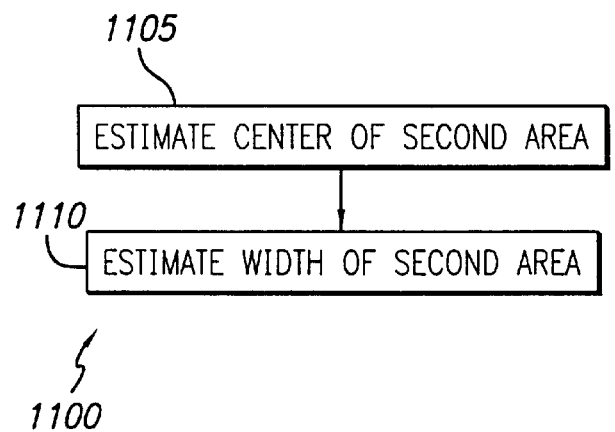
FIGS. 11 and 13 are flow charts of processes for estimating a center and size of a second area related to a selected area of interest.

One way to ensure that the averaging process 700 and 705 more accurately determine the edge zone position and direction in the area of interest is to take the average over a second, better defined area $B_s$ that contains the intended border near its center and that contains as few distracting borders as possible. This is in contrast to the average taken over the entire area of interest B as written in Eqns. 1 and 2. Referring also to FIG. 11, a process 1100 is performed for determining the second area $B_s$ of the area of interest B. Initially, a center of the second area $B_s$ is estimated (step 1105), and then a width of the second area $B_s$ is estimated (step 1110).

Figure 12:
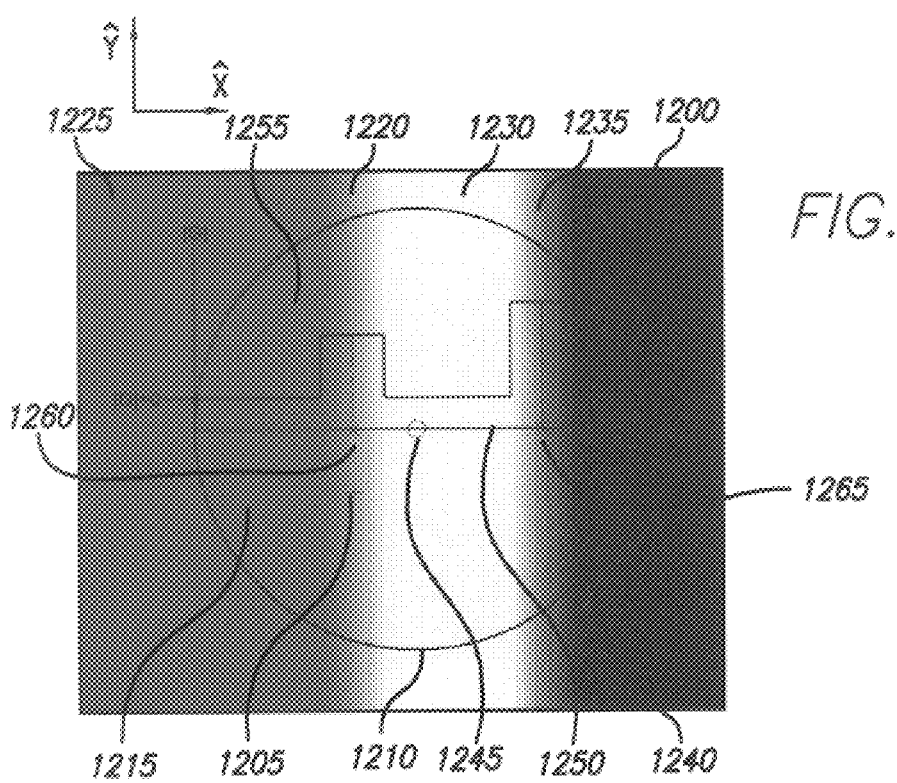
FIG. 12 shows a digital image in which a center of a second area is determined using the process of FIG. 13.

Referring also to FIG. 12, for example, a portion 1200 of a digital image is shown that illustrates each of these steps. In portion 1200, a previously estimated edge zone position $\vec{p}_{prior}$ 1205 is shown along with a current brush 1210 that bounds a current area of interest 1215. In this portion 1200 there are two distinct borders: border 1220 between a red region 1225 and a yellow region 1230 and border 1235 between the yellow region 1230 and a blue region 1240. The user is tracing along the red/yellow border 1220 as indicated by the previously estimated edge zone position 1205.

Because the red/yellow border 1220 is parallel to direction $\hat{y}$, the previously determined edge zone direction would be perpendicular to the direction $\hat{y}$ or parallel to direction $\hat{x}$. A center 1245 of the current area of interest 1215 lies along a center segment or path 1250 that is positioned parallel to the previously determined edge zone direction. Because the brush 1210 is circular in shape, the center segment 1250 lies along a diameter of the circle. The brush may have other geometrical shapes, for example, polygonal shapes such as rectangles or squares. When the brush is a polygon, the center segment may be, for example, positioned along a center line of a side of the polygon. Moreover, the center segment may be multiple pixels wide in the direction perpendicular to the previously determined edge zone direction. In FIG. 12, the center segment 1250 is one pixel wide. In any case, the segment 1250 is used when estimating the center of the second area $B_s$ during step 1105.

Figure 13:
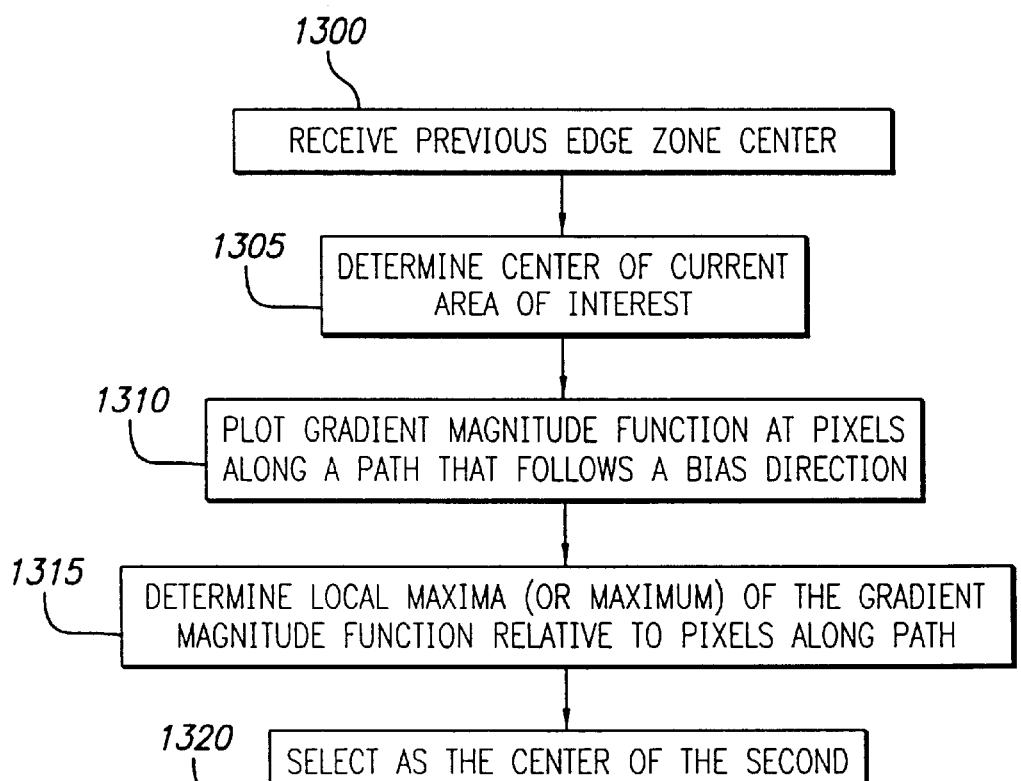

Referring also to FIG. 13, the center of the second area $B_s$ may be estimated using the process 1105. Initially, a previous edge zone position is received (step 1300) and a center of the current area of interest is determined (step 1305). For example, as shown in FIG. 12, the previous edge zone position 1205 may be received and the center 1245 of the area of interest 1215 may be determined.

Next, a function of the gradient magnitudes of pixels that lie within the center segment is plotted or graphed along the center segment at each pixel position (step 1310). Because the center segment may have a multi-pixel width (measured along a $\hat{y}$ direction), the function may be based on the gradient magnitudes at each pixel along the narrow width. For example, the function may be average value of the gradient magnitude at those pixels along the narrow width. Alternatively, the function may be the average value of the square of the gradient magnitude at those pixels along the narrow width.

Referring again to FIG. 12, for example, gradient function 1255 is plotted along the center segment 1250. For clarity, the plot is shown slightly offset from the center segment 1250. The gradient function 1255 is 0 along the center segment 1250 in the red region 1225. Along the linear blend border 1220 from the red region 1225 to the yellow region 1230, the gradient function 1255 rises to a first non-zero constant level. Then, the gradient function 1255 is again 0 along the center segment 1250 in the yellow region 1230 until reaching the linear blend border 1235 from the yellow region 1230 to the blue region 1240 at which the gradient function 1255 rises to a second non-zero constant level. The gradient magnitude is constant over regions 1220 and 1235 because the borders are linear ramps. For example, if x is a distance along the center 1245, c1 is the color in the red region 1225 and c2 is the color in the yellow region, then the color c may be written as: c=(1−x)c1+(x)c2. The gradient, dc/dx, is found by taking the derivative of the color with respect to the position and is given by c2−c1, which is a constant. Because the yellow/blue border 1235 lies between two color regions, which have relatively greater color contrast, the second non-zero constant level is greater than the first non-zero constant level.

Using the plot of the gradient magnitude at the positions along the center segment, the process 1105 then determines each local maximum $q_j$(step 1315). For example, in FIG. 12, the local maxima 1260, 1265 lying within, respectively, border 1220 and border 1235, are indicated by the x's along the center segment 1250. The set of all local maxima $\{q_j\}$ defines a set of candidate positions for the center of the second area $B_s$. Thus, for example, in FIG. 12, there are two candidate positions for the second area $B_s$. In this case, both local maxima extend over nonzero length intervals and the centers of the intervals are used to define the candidates $\{q_j\}$.

Figure 14A:
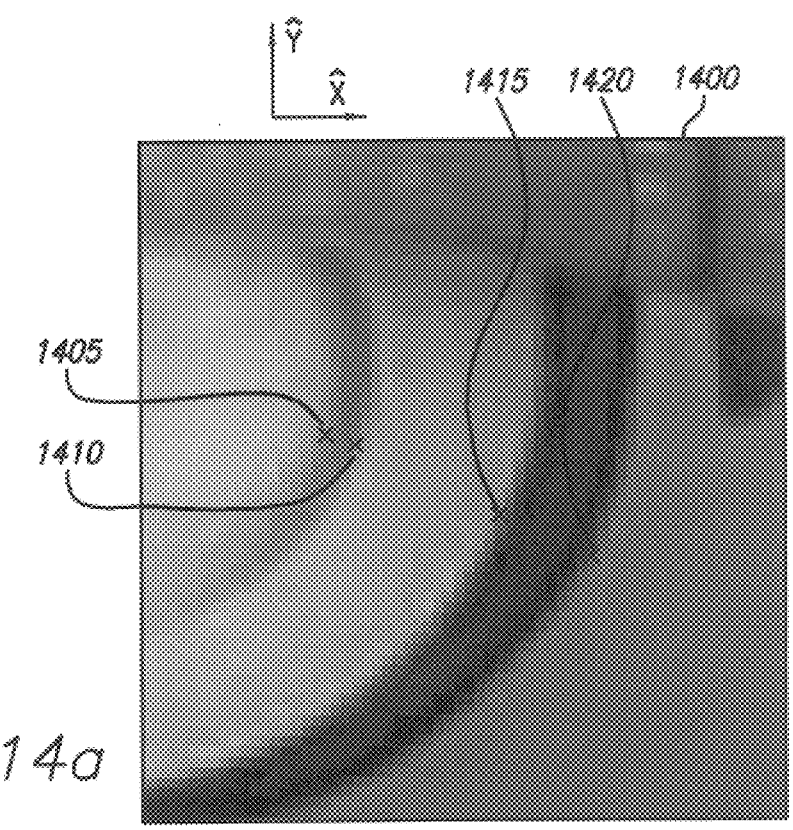
FIG. 14a shows a digital image in which candidates for a center of a second area of a selected area of interest are determined using the process of FIG. 13.
Figure 14B:
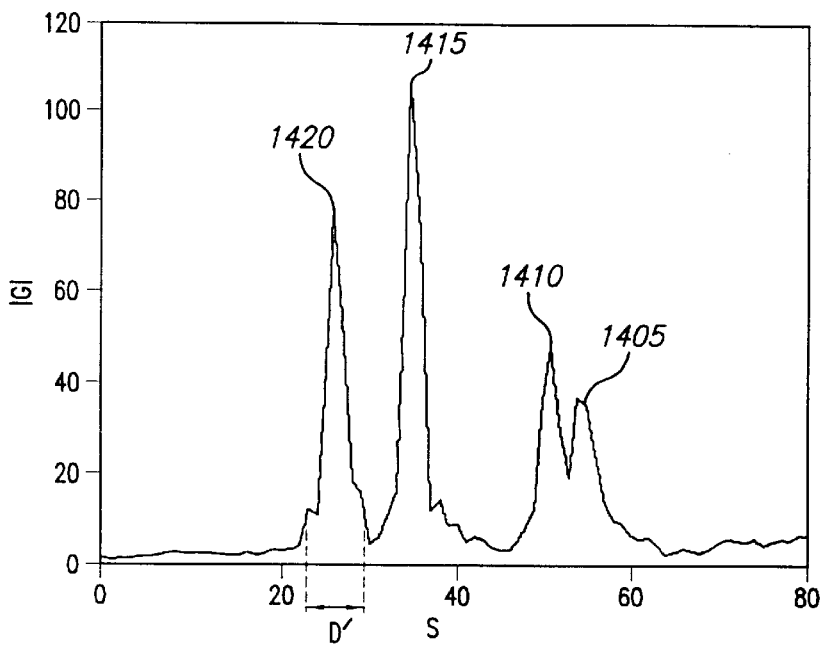

Referring also to portion 1400 of the image 1005 in FIG. 14a, candidate positions 1405, 1410, 1415, and 1420 are indicated by the x's lying along a center segment (not shown) of brush 1010 from FIG. 10a. In this case, there are four candidate positions for the * center of the second area $B_s$ of the area of interest 1007. The four candidate positions 1405, 1410, 1415, and 1420 correspond to each of the four local maxima, as graphed in FIG. 14b, which shows the gradient magnitude function versus position along the center segment of brush 1010. In this case, the center segment s is directed at an angle that is around 135 degrees relative to the $\hat{x}$ direction.

In finding the local maxima (step 1315), the process 1105 must first compare the value of the gradient magnitude function to a threshold value to determine whether a variation in the gradient magnitude function is due to noise or a border. Moreover, to simplify computation, an averaging technique may be employed—if two gradient magnitude function values are within the threshold value of each other, then the values may be considered as equal. Then, when it is determined that the gradient magnitude function is greater than the threshold value at a particular position along s, the process 11 05 includes determining whether the gradient magnitude function is increasing on one side of that position and decreasing on the other side of that position. If so, then the gradient magnitude function at the particular position has effectively reached a maximum value.

After determining the local maxima (step 1315), the process 1105 includes selecting as the center of the second area $B_s$ one of the local maxima (step 1320). This may be accomplished in any one of several different techniques. For example, the center of the second area may be chosen to be the local maximum that is nearest to the previously estimated edge zone position $\vec{p}_{prior}$. For example, if this technique were used, then in FIG. 12, the center of the second area would be the local maxima lying in the red/yellow border 1220.

Another technique for selecting one of the local maxima is to rank or score each local maximum by a gradient value of the pixels that are crossed along a segment connecting $\vec{p}_{prior}$ to that local maximum. If the gradient value of the pixels that are crossed in moving from $\vec{p}_{prior}$ to the local maximum is relatively low, then the rank of that local maximum center would be lower. A low gradient value of the pixels that are crossed along the segment connecting $\vec{p}_{prior}$ to the local maxima center probably indicates that $\vec{p}_{prior}$ and that local maximum lie on different borders. Referring to FIG. 12, for example, the local maxima lying in border 1235 is on a different border from $\vec{p}_{prior}$ which lies in border 1220. The segment connecting that local maximum and $\vec{p}_{prior}$ includes a relatively low gradient value in the yellow region 1230.

Both of these techniques may be used in ranking each of the local maxima. For example, a rank $W_x$ associated with a local maximum $q_j$ may be determined by:

$$W_x = \frac{\int_{\vec{r} \in A} \|\vec{G}(\vec{r})\|}{\text{size of segment from } \vec{p}_{prior} \text{ to } q_j}, \tag{7}$$

where A is the segment from $\vec{p}_{prior}$ to $q_j$. Another possible rank may depend on the square of the gradient magnitude. In general, the rank depends on the previously estimated edge zone position and the local maximum, and the rank should be higher if the local maximum is on the same border as the previously estimated edge zone position.

Another possible rank is:

$$W_x = \frac{\int_{\vec{r} \in A} \cos^2(\omega(\vec{r}) - \Theta_{bias}) \times \begin{cases} 1 & \text{if } |\vec{G}(\vec{r})| \geq \tau_3, \\ 0 & \text{otherwise} \end{cases}}{\text{size of segment from } \vec{p}_{prior} \text{ to } q_j}, \tag{8}$$

where $\tau_3$ is a predetermined threshold. The predetermined threshold $\tau_3$ may be around 5 for color levels ranging from 0 to 255. This rank measures an average (per pixel) amount of agreement in gradient angle with the bias direction. The rank estimate of Eqn. (8) may be more useful than that of Eqn. (7) when tracing along a weaker border that is in the presence of a nearby stronger border. In such a situation, if the previously estimated edge zone position lies on a weaker border and the local maximum lies on a stronger border, then higher gradients exist nearer the local maximum and lower gradients exist in the region of constant color between the two borders. However, if the size of the segment between the two borders is small, then the average may be large and Eqn. (7) might incorrectly indicate a relatively higher ranking for the local maximum located on the stronger border. Because the gradient magnitude is not a factor in Eqn. (8), this problem is reduced.

The rank $W_x$ of a local maximum may additionally depend on the distance from the previously estimated edge zone position to the local maximum.

If, even after ranking the local maxima, it is still unclear which of the local maxima is the best candidate for the second area center, then the process 1105 may include selecting that local maximum that is nearest to the brush center. For example, in FIG. 12, the local maximum center lying in border 1220 is nearer to the center 1245 of the brush 1210 than the local maximum lying in border 1235.

Figure 1:
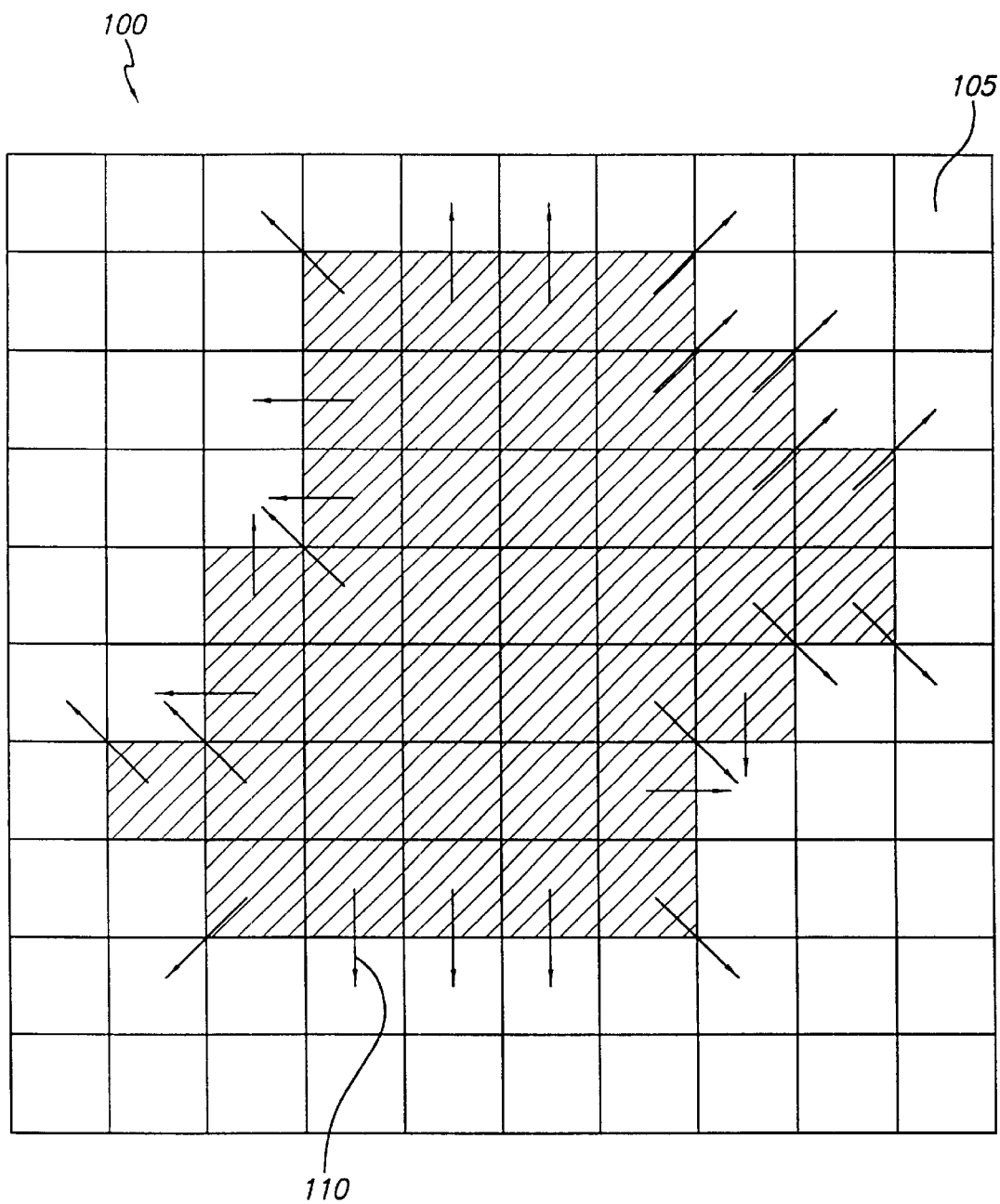
FIG. 1 shows a 10-pixel×10-pixel digital image in gray scale color space.

In either case, referring again to FIG. 1, after the second area center is estimated, the process 1100 includes estimating a width D' of the second area (step 1110). The width of the second area may be estimated using a technique that assumes that the width of the border that the user is tracing is unlikely to change by a significant amount over a relatively short distance along that border. Thus, a simply strategy for estimating the width D' of the second area uses the relationship $D'=k \times \Delta_{prior}$, where $\Delta_{prior}$ is the previously estimated edge zone width and k is a predetermined constant. The constant k may by on the order of 1, for example, 1.5 or 2.0. Thus, if a size of the brush is 80 pixels, the previously estimated edge zone width is 5 pixels, and the constant k has a value of 2.0, then D' is 10. Another possibility for the second area width D' is simply the size of the brush. Thus, in the example in which the brush has a size of 80 pixels, the second area width D' is 80 pixels.

The width of the second area may be estimated using the gradient magnitude function to effectively determine a width of the local maximum peak. The width of a peak is given by the width at which the height (the gradient magnitude function) of the peak falls below a predetermined threshold. For example, in FIG. 14b, if the local maximum 1420 is selected as the second area center, the width of the second area center may be estimated to be a width of the peak 1420. If a threshold $\tau_D$, of 10 is used, then the width estimate D' for the border on which the local maximum 1420 occurs is around 29−23=6.

Moreover, the second area width may be a width somewhat greater than the estimated width of the best ranked local maximum candidate to ensure that the second area completely contains the border.

Indicate Determined Edge Zone Model (Step 420)

Referring again to FIG. 4, after the edge zone model has been determined (step 415), the process 400 indicates the determined edge zone model to the user (step 420). This indication provides the user with feedback as to how well the processor performing the process 400 is working. Thus, if the processor indicates a determined edge zone model that is inconsistent with the user's belief, the user knows that the processor is not finding the border correctly.

As discussed above, one way to indicate the determined edge zone model is to highlight the edge zone model as shown in FIG. 5, where the highlight 520 indicates the determined edge zone model. Thus, the highlight indication provides the user with information about the size and location of the edge zone model. If the user sees that the highlighted information is incorrect, then the user may adjust the tracing of the border accordingly.

Figure 15:
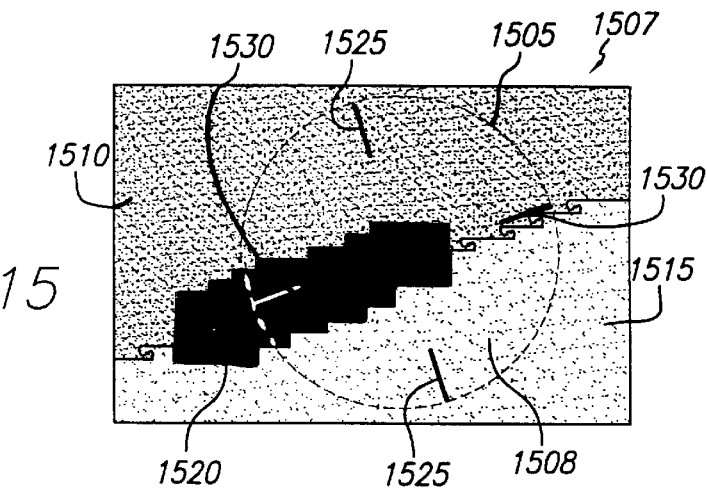
FIG. 15 shows a portion of a digital image in which a position, size, and direction of the determined edge zone model are indicated.

However, it is possible that the user would be unaware of an incorrect edge zone direction when using the brush 510, 530 of FIGS. 5 and 6, which only indicates the size and location of the edge zone. Therefore, a special brush 1505 may be used, as shown in FIG. 15, to indicate, in addition to a location and a size, a direction of the edge zone. A portion 1507 of a digital image traced by a user is shown in which the traced border indicates an area of interest 1508 between one region 1510 and a second region 1515. The processor indicates the position $\vec{p}$ and size Δ of the determined edge zone to the user by highlighting the determined edge zone model (shown as black highlight 1520). The processor indicates the direction θ of the determined edge zone model (that is, a direction perpendicular to a tangent of the border) by adding directional lines 1525, 1530 to the brush 1505.

The lines 1525 are parallel to the edge zone direction θ and the lines 1530 are perpendicular to the edge zone direction. Thus, as the user is tracing the border, the brush 1505 rotates so that the lines 1525 align with the edge zone direction θ. In this way, the user receives feedback in the form of the special brush 1505 that indicates a direction of the edge zone, and the user may then adjust the area of interest tracing to accommodate for any problems.

Figure 16:
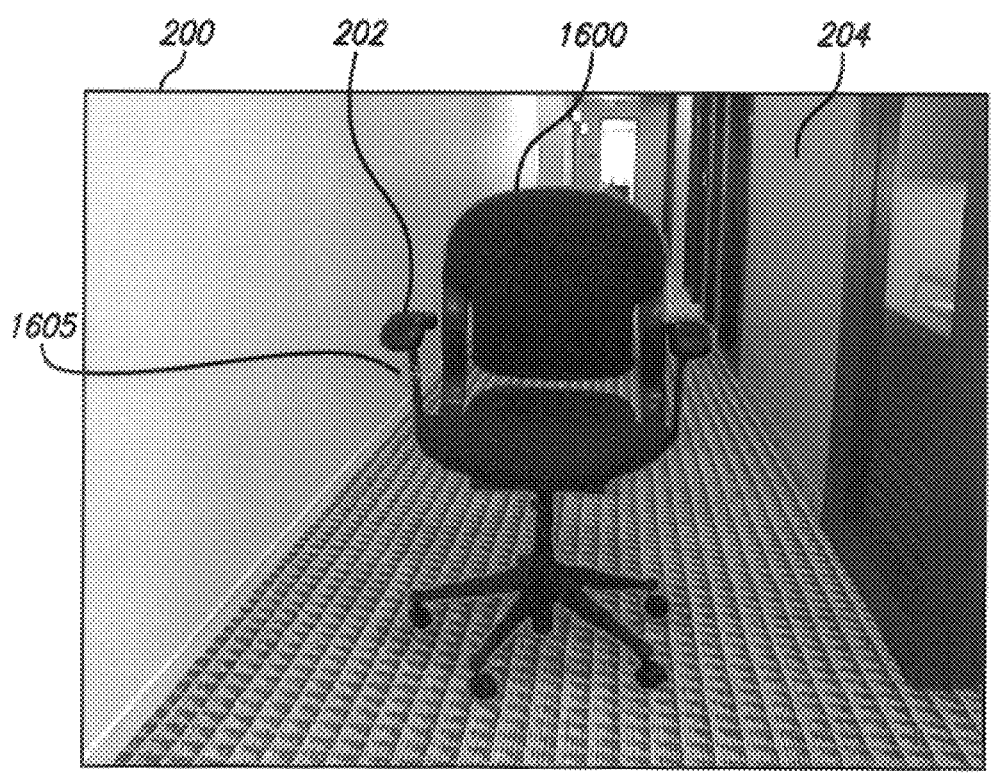
FIG. 16 shows the digital image of FIG. 2a in which the user is highlighting a border of the chair using the processes of FIGS. 7–9.

Referring also to FIG. 16, for example, the digital image 200 of the chair in the background region 204 (including hallway, doors, floor, windows, and walls) is shown. In this image, a user has partially traced along the border separating the chair 202 from the background region using process 400 as shown by highlight 1600. The user identified an area of interest using brush 1605. The user receives basic feedback indicating the position and size of the identified edge zone by viewing the highlight 1600. Additionally, the user receives advanced feedback indicating the direction of the identified edge zone using the special brush 1605. In this example, the diameter of the special brush is 35 pixels.

Post-identification Processing (Step 1700)

Referring again to FIG. 4, after the user-identified border is identified (step 430), the border data is prepared for post-identification processing (step 435).

Figure 17:
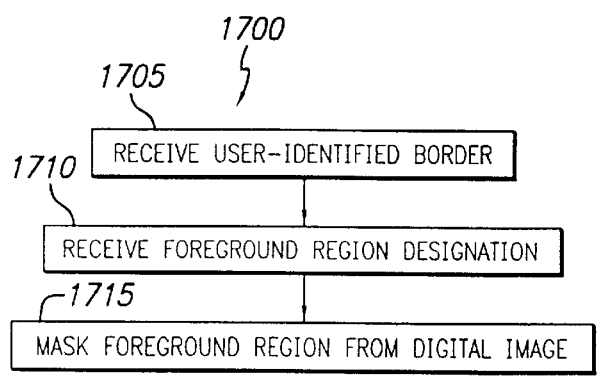
Figure 18A:
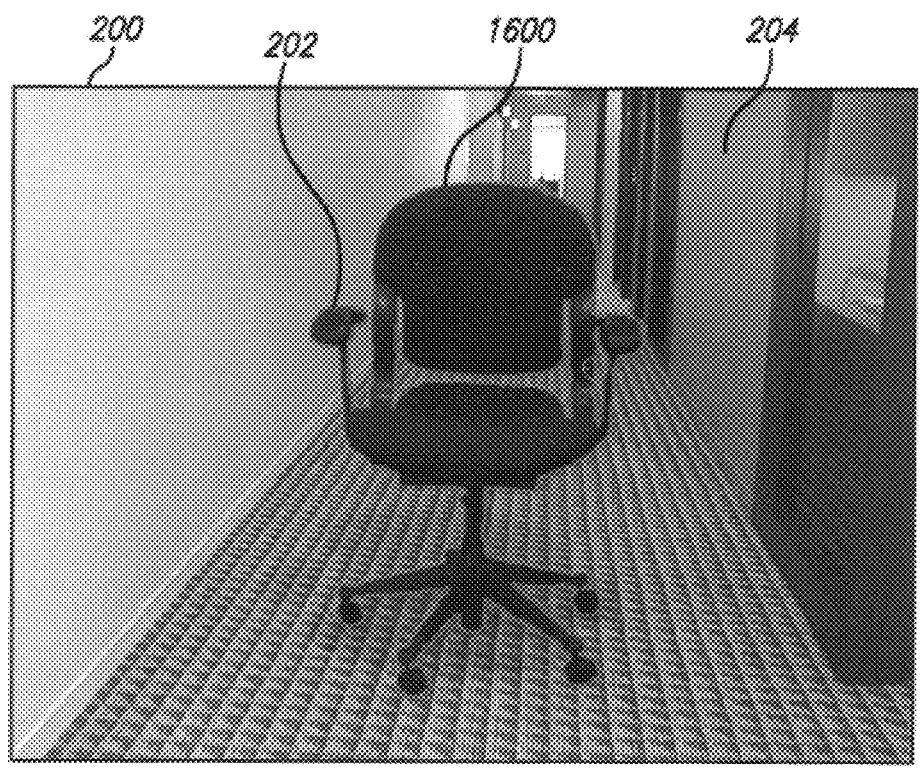
FIG. 18a shows the digital image of FIG. 2a in which the user has completely highlighted the border of the chair using the processes of FIGS. 7–9.

The post-identification process may include masking and/or extraction of an object indicated by the user-identified border. Referring to FIG. 17, the post-identification processing includes process 1700 for masking an object indicated by the user-identified border. Initially in the process 1700 the user-identified border is received (step 1705). For example, referring to the digital image 200 shown in FIG. 18a, the post-identification process begins by receiving a user-identified border (shown as completed highlight region 1600) determined using process 400.

Figure 18B:
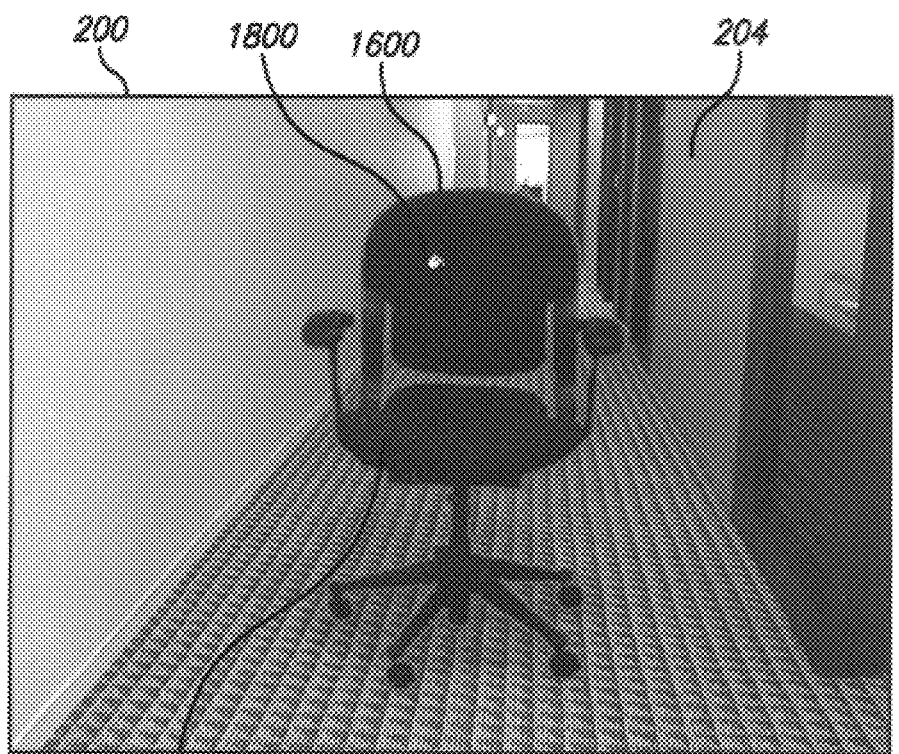
FIG. 18b shows the digital image of FIG. 2a in which the foreground region has been selected.

The post-identification process then receives a designation of the foreground region (step 1710). This designation may include the user clicking on either the foreground region or the background region. For example, in FIG. 18b, the user designated the foreground region by clicking on object 202, as indicated by cursor 1800.

Figure 3A:
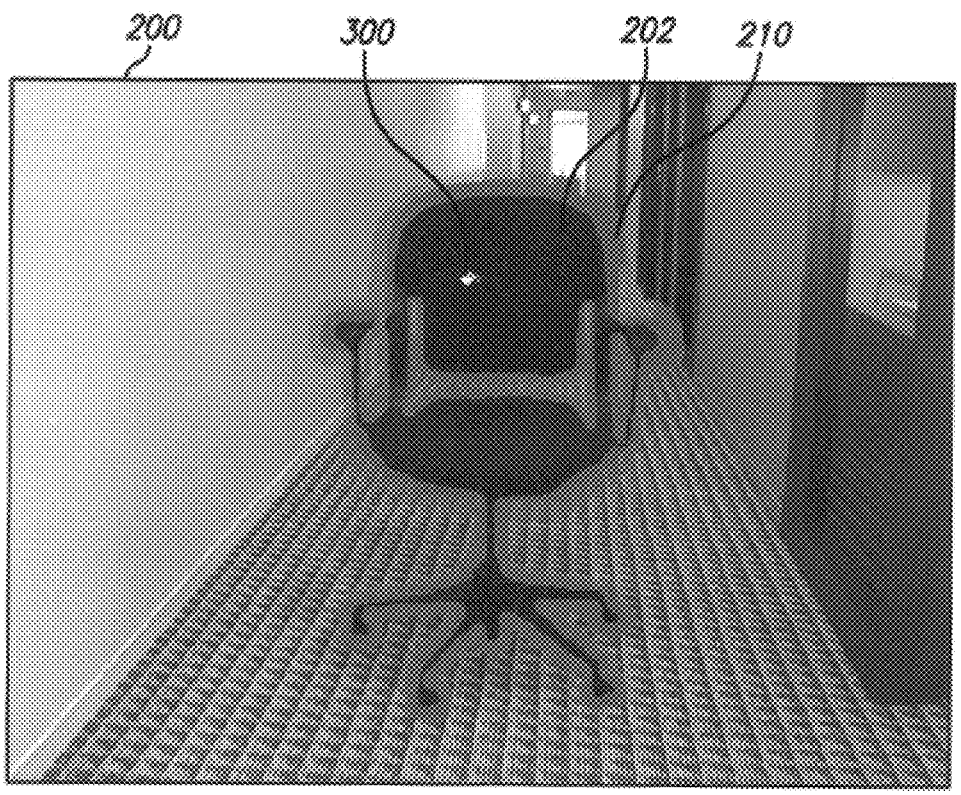
FIG. 3a shows the digital image of FIGS. 2a and 2b in which the user has selected the chair as the foreground region.
Figure 3B:
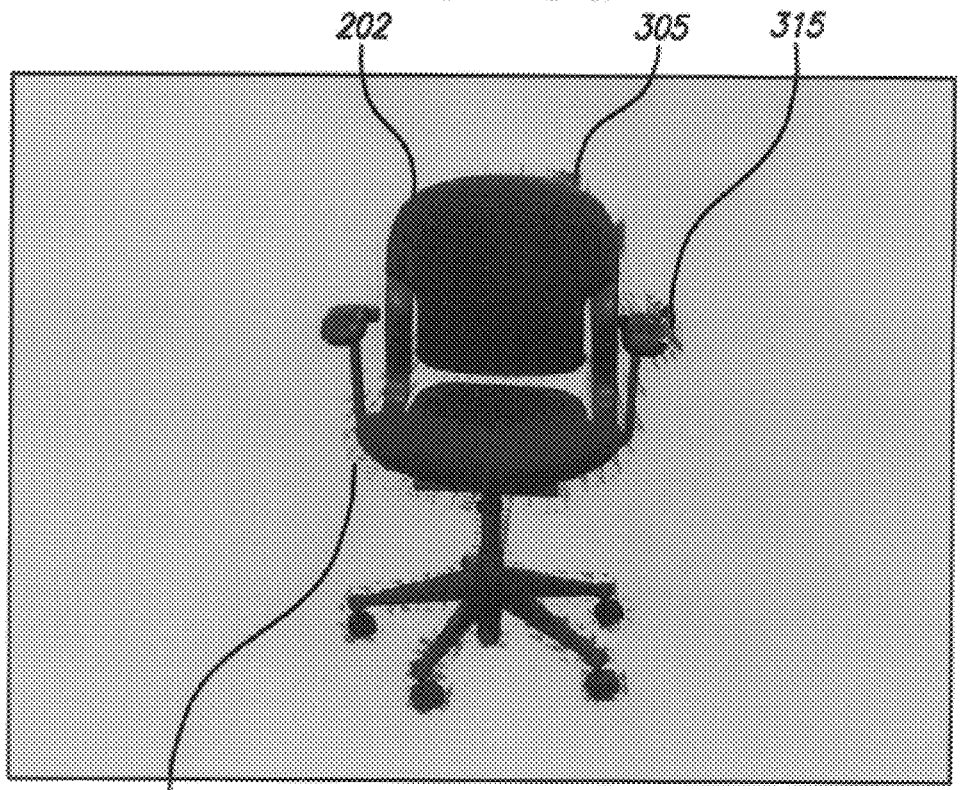
FIG. 3b shows the digital image of FIGS. 2a and 2b in which the chair has been masked.
Figure 18C:
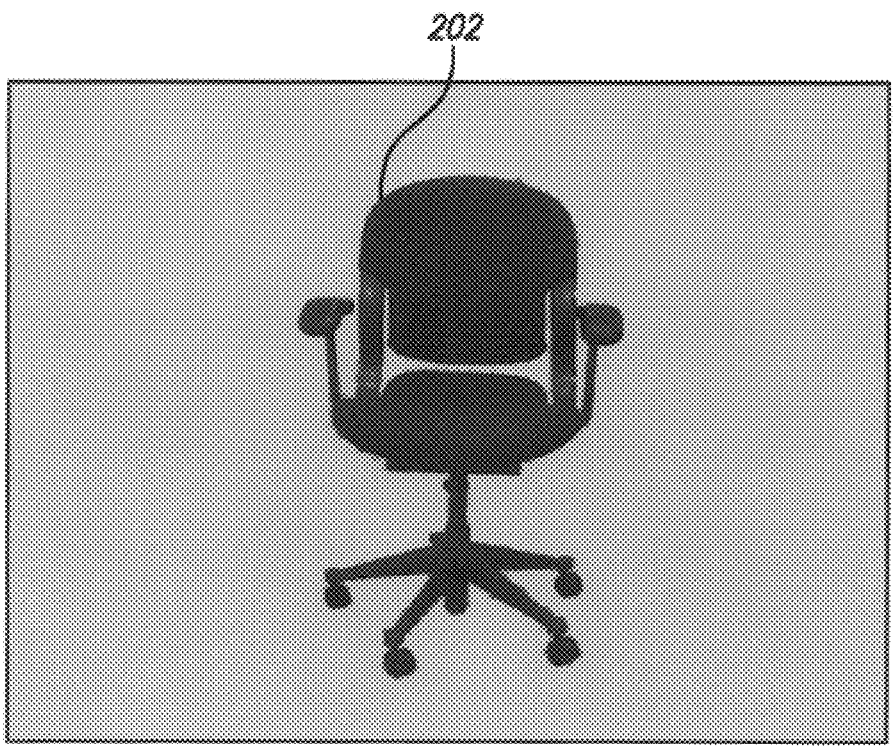
FIG. 18c shows the digital image of FIG. 2a in which the chair has been masked from the digital image using the processes of FIG. 17, 19, 20, 22, and 23.

Following the foreground region designation (step 1710), the foreground region is masked from the digital image using the received user-identified border (step 1715). FIG. 18c shows the results of the application of the post-identification process for masking the foreground region 202 from an image 200 using the user-identified border 1600 from FIG. 18a. It is evident in comparing the masked image of FIG. 18c to the masked image of FIG. 3b that the border detection technique detailed above in FIGS. 4-16 improves the accuracy of the masking result. The improvements are due to the explicit computation and usage of accurate estimates of the object border. For example, as shown in FIG. 18c, regions 305, 310, and 315 shown in FIG. 3b have been effectively cleaned up—that is, pixels in those regions are more often correctly assigned to either the foreground region 202 or the background region 204.

Figure 19:
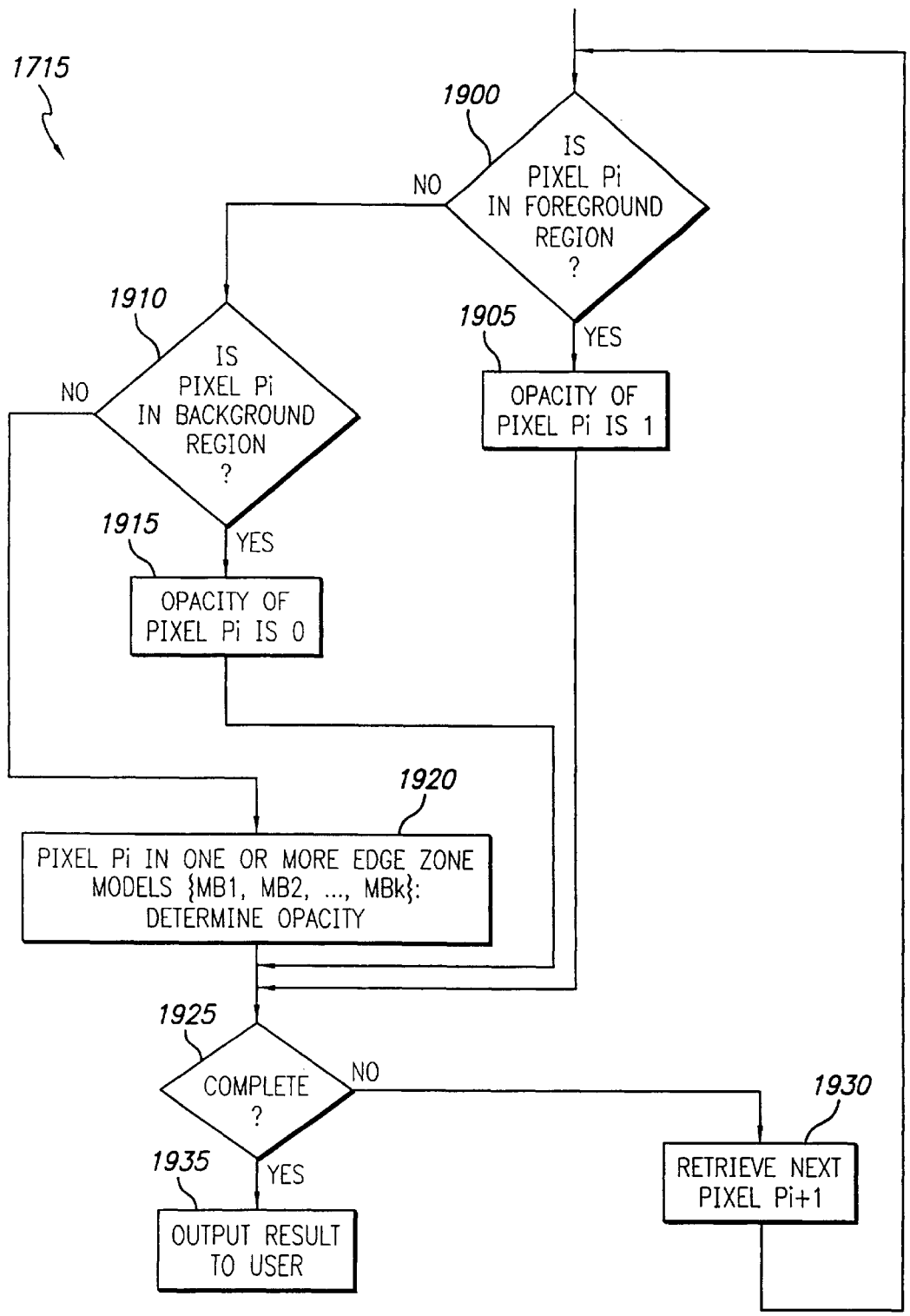

Referring also to FIG. 19, the masking process 1715 includes determining whether a particular pixel in the digital image is in the foreground region (step 1900), and if so, assigning an opacity of 1 to that pixel (step 1905).

If the particular pixel is not within the foreground region (step 1900), then the particular pixel may be within the background region (step 1910). If the particular pixel is within the background region, an opacity of 0 is assigned to that pixel (step 1915).

If the particular pixel is neither within the foreground region (step 1900) nor within the background region (step 1910), then the pixel is in one or more edge zone models associated with that pixel $\{M_B1, M_B2, \ldots, M_Bk\}$ and the opacity for that pixel is determined based on the one or more associated edge zone models (step 1920). When all of the pixel's opacity values are set (step 1925), the extraction is complete.

If the opacities for any pixels in the image have not yet been determined (step 1925), the next pixel Pi+1 in the image is retrieved (step 1930) and the process 1715 determines whether that pixel is within the foreground region (step 1900). If the opacities for all the pixels in the image have been determined, (step 1925), the result of the determination (the extraction) is output to the user (step 1935) by, for example, masking the object, and can include adjusting the colors of each of the pixels based on their determined opacities. As shown in FIG. 18c, all pixels clearly lying within the background region are assigned a color of yellow, all pixels in the foreground region 202 retain their original color assignment, and pixels that fall within one or more edge zone models of the border of the object are assigned a color depending on the opacity.

Figure 20:
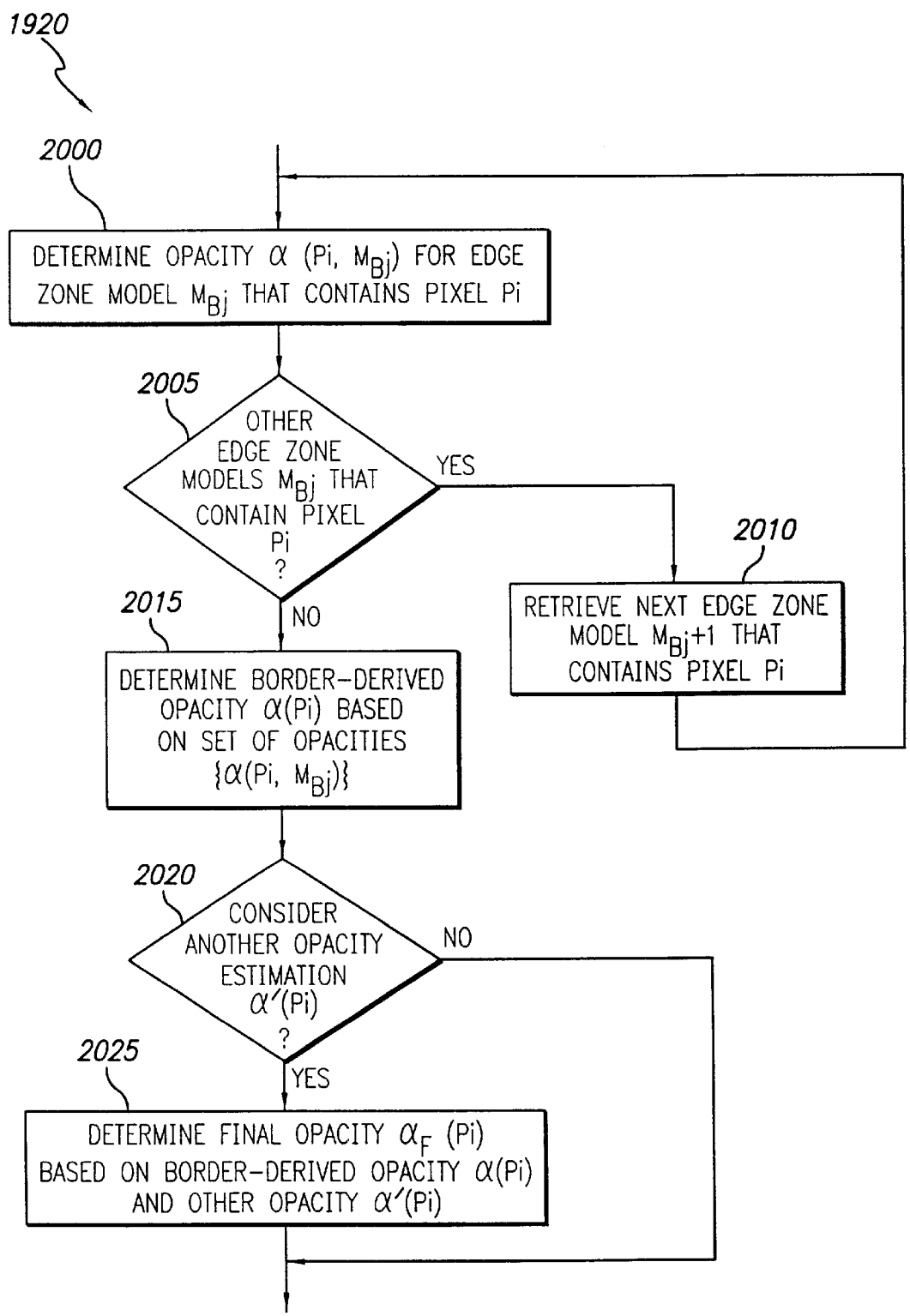

Referring also to FIG. 20, a process 1920 is performed for determining the opacity for a pixel Pi associated with an edge zone model. The process estimates the opacity $\alpha(Pi, M_Bj)$ for an edge zone model $M_Bj$ that contains that pixel Pi (step 2000) based on that edge zone model.

Figure 21:
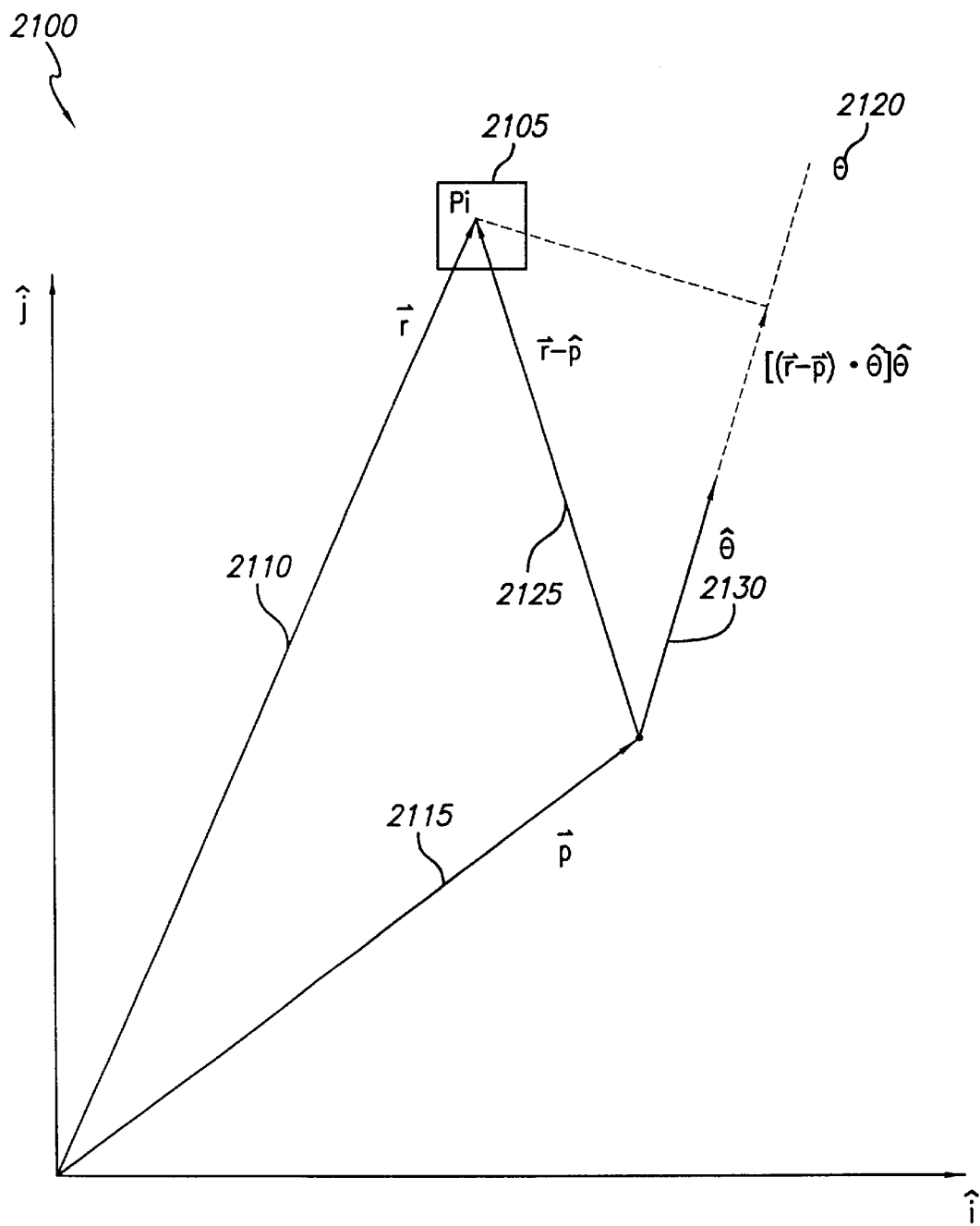
FIG. 21 shows a two-dimensional image space in which the edge zone model position and direction and a pixel location are used to determine an opacity for the pixel.

The estimation includes comparing the position $\vec{r}$ of the pixel Pi to the determined edge zone position $\vec{p}$ along the edge zone direction $\theta$. Referring also to FIG. 21, such a comparison is shown for a two-dimensional image space 2100 given by unit vectors $\hat{i}$ and $\hat{j}$. Pixel Pi 2105 is defined by its position r 2110, and the edge zone model is defined by position $\vec{p}$ 2115 and direction $\theta$ 2120. The comparison includes determining a difference $(\vec{r} - \vec{p})$ 2125 between the pixel position r and the edge zone position $\vec{p}$ along the edge zone unit direction $\hat{\theta}$ 2130. This may be written mathematically as: $\hat{\theta} \cdot (\vec{r} - \vec{p})$, and is shown graphically as $[\hat{\theta} \cdot (\vec{r} - \vec{p})]\hat{\theta}$ in FIG. 21.

For example, for a generally linear border, the opacity may be determined using $$\kappa = \frac{\frac{\Delta}{2} + \hat{\theta} \cdot (\vec{r} - \vec{p})}{\Delta},$$

which depends on the comparison term $\hat{\theta} \cdot (\vec{r} - \vec{p})$ and the previously determined edge zone width $\Delta$. The opacity may be written as:

$$\alpha(Pi, M_B) = \begin{cases} \kappa & \text{if } 0 \leq \kappa \leq 1 \\ 0 & \text{if } \kappa < 0 \\ 1 & \text{if } \kappa > 1 \end{cases} \quad (9)$$

Thus, the opacity is linear in the comparison term $\hat{\theta} \cdot (\vec{r} - \vec{p})$. The opacity may be determined using a parameter that may be a more complicated function of the comparison term $\hat{\theta} \cdot (\vec{r} - \vec{p})$, for example, the opacity may be a non-linear function of the comparison term $\hat{\theta} \cdot (\vec{r} - \vec{p})$. Examples of a non-linear function are cubic or sigmoid functions.

After the opacity a (Pi, $M_Bj$) for an edge zone model is estimated (step 2000), the process 1920 includes determining whether the pixel Pi is contained in any other edge zone models $M_Bj$ (step 2005), and if so, the process 1920 includes retrieving the next edge zone model that contains that pixel (step 2010) and determines the opacity for the next edge zone model (step 2000). If the pixel Pi is not contained in any other edge zone model (step 2005), the process 1920 includes estimating a border-derived opacity a (Pi) based on the set of opacities $\{\alpha(Pi, M_B1), \alpha(Pi, M_B2), \ldots, \alpha(Pi, M_Bk)\}$ for that pixel determined using the edge zone models (step 2015).

The process 1920 then includes determining whether to consider a second or previously estimated opacity $\alpha'$ (Pi) (step 2020). The determination may be based on a direct input from the user; for example, the user may click on an icon in a graphical user interface to select a second opacity. Alternatively, the determination may be automatic and based on the border-derived opacity estimation or the second opacity.

For example, if the border-derived opacity $\alpha(Pi)$ estimated at step 2015 is associated with a relatively low measure of confidence, then a second opacity estimate may be used to improve extraction. As another example, when estimating the border-derived opacity at a pixel, an estimate of an error E associated with estimating the border-derived opacity may be used. Thus, the second opacity estimate may be used to improve the extraction if the error associated with the border-derived opacity is less than some predetermined threshold error. On the other hand, a second opacity estimate may be used if an error E' associated with the second opacity estimate is less than the error E associated with the border-derived opacity.

In any case, the process includes determining a final opacity $\alpha_F(Pi)$ based on the border-derived opacity $\alpha(Pi)$ and the second opacity $\alpha'(Pi)$ (step 2025) when it is determined that the second opacity $\alpha'(Pi)$ should be considered (step 2020).

The process may include estimating the border-derived opacity $\alpha(Pi)$ for a pixel using the set of opacities estimated at step 2000. Referring also to FIG. 22, for example, the process 2015 may include determining which edge zone model in the set of edge zone models $\{M_B1, M_B2, \ldots, M_Bk\}$ associated with the pixel Pi exhibits the highest measure of confidence (step 2200). It is presumed that the edge zone model with the best measure of confidence is the most accurate edge zone model associated with that pixel. Thus, the process includes selecting the estimated opacity determined for the edge zone model with the best measure of confidence as the border-derived opacity $\alpha(Pi)$ (step 2205). Alternatively, the process 2015 may include weighting the estimated opacities $\{\alpha(Pi, M_Bj)\}$ for the pixel Pi by the corresponding measures of confidence $\chi j$ (step 2210). Then, a weighted average value of opacities for that pixel may be calculated (step 2215):

$$\alpha(Pi) = \frac{\sum_j \chi j \times \alpha(Pi, M_Bj)}{\sum_j \chi j}. \quad (10)$$

The process may include simply selecting as the border-derived opacity $\alpha(Pi)$ the most recently estimated opacity for that pixel (step 2220).

If it is determined that a second opacity should be considered (step 2020), the process 1920 may include calculating a final opacity $\alpha_F$ (Pi) based on the border-derived opacity $\alpha(Pi)$ and the second opacity $\alpha'(Pi)$ (step 2025). The second opacity $\alpha'(Pi)$ may be an opacity estimated using, for example, the techniques of application Ser. No. 09/298,872, which was discussed above.

Referring also to FIG. 23, the final opacity may be calculated using process 2025. In process 2025, the second opacity α'(Pi) may be selected (step 2300) regardless of the estimated values or errors of the opacities. Alternatively, the border-derived opacity α(Pi) may be selected (step 2305) regardless of the estimated values or errors of the opacities.

In another implementation, the process 2025 includes selecting either the border-derived opacity α(Pi) or the second opacity α'(Pi) based on the estimated error E in determining the border-derived opacity α(Pi) (step 2310). For example, if the estimated error E is greater than a predetermined threshold error TI, then the second opacity α'(Pi) is selected for that pixel. In this case, it is assumed that because the estimated error E in the border-derived opacity α(Pi) is so high, then the border-derived opacity α(Pi) exhibits a relatively lower accuracy. Alternatively, if the estimated error E is less than a predetermined threshold error T2, then the border-derived opacity α(Pi) may be selected. In this case, it is assumed that because the estimated error E in the border-derived opacity α(Pi) is so low, then the estimated border-derived opacity α(Pi) exhibits a relatively higher accuracy.

In another implementation, the process 2025 includes selecting either the border-derived opacity α(Pi) or the second opacity α'(Pi) based on the estimated error E' in determining the second opacity α'(Pi) (step 2315). For example, if the estimated error E' is greater than a predetermined threshold error T3, then the border-derived opacity α(Pi) may be selected. In this case, it is assumed that because the estimated error E' in the second opacity α'(Pi) is so high, then the estimated second opacity α'(Pi) exhibits a relatively lower accuracy. Alternatively, if the estimated error E' is less than a predetermined threshold error T4, then the second opacity α'(Pi) may be selected. In this case, it is assumed that because the estimated error E' in the second opacity α'(Pi) is so low, then the estimated second opacity α'(Pi) exhibits a relatively higher accuracy.

The process 2025 may include selecting either the border-derived opacity α(Pi) or the second opacity α'(Pi) based on the estimated errors E and E' (step 2320). For example, if the estimated error E in the border-derived opacity α(Pi) is greater than a predetermined threshold error T5 and the estimated error B' in the second opacity α'(Pi) is less than the predetermined threshold T5, then the second opacity α'(Pi) may be selected. Likewise, if the estimated error E in the border-derived opacity α(Pi) is less than a predetermined threshold error T6 and the estimated error E' in the second opacity α'(Pi) is greater than the predetermined threshold error T6, then the border-derived opacity α(Pi) may be selected.

The process 2025 may include calculating a final opacity based on the estimated errors in both the border-derived opacity α(Pi) and the second opacity α'(Pi) (step 2330). For example, the process 2025 may include weighting the opacities by the inverse of their respective estimated errors and then take a weighted average of the opacities to determine the final opacity.

The techniques and methods described here are advantageous when a user desires to identify a border, for example, so that an object can be masked and/or extracted from a digital image. The techniques and methods permit the user to trace along a border that defines the object and then select the object to be masked and/or extracted. The border is automatically determined based on the traced border, and after the user selects the object to be masked, the object is automatically masked.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

These elements also can be found in a conventional desktop or workstation computer as well as other computers suitable for executing computer programs implementing the methods described here, which can be used in conjunction with any content viewing or manipulation software, or any other software capable of displaying digital images. Any of the foregoing may be supplemented by, or implemented in, specially designed ASICs (application specific integrated circuits). The systems and techniques may be implemented as a standalone utility or plug in utility. Likewise, the systems and techniques may be implemented at the operating system level or as a feature of an application.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

For example, the brush may include a single set of lines (either 1525 or 1530 of FIG. 15) to indicate the edge zone direction θ at step 420 (FIG. 4). The relative length of the lines 1525, 1530 may be adjusted to clearly indicate that one set of lines aligns with the edge zone direction while the other set of lines aligns with a perpendicular direction to the edge zone direction. For example, in FIG. 15, lines 1525 are longer than lines 1530.

The user may receive feedback about the measure of confidence in the edge zone model by, for example, changing the color of the highlight that indicates the determined edge zone model or the brush. For example, the highlight may be lighter when the measure of confidence is relatively low, and the highlight may get darker as the measure of confidence increases.

The opacity estimation for a single extraction may involve several different opacity functions. For example, a linear opacity function may be more accurate to use near a linear border than a non-linear opacity function. In that case, for example, a non-linear opacity function may be used throughout the extraction except when it is determined that the border exhibits a certain degree of linearity.

The error estimate E' for the second opacity may be a relative error $E_{rel}'$ that measures the error in the linear blend model relative to the distance, in color space, between the color cf of the nearby foreground region pixel and the color cb of the nearby background region pixel: $E_{rel}'=E'/|cf-cb|$. For a fixed absolute error, the relative error is greater for colors cf and cb that are nearer each other. The absolute error in the linear blend model is the distance, in color space, from the observed color to a nearest point on the line segment that connects the linear blend model colors cf and cb.

The final opacity may be selected based on a comparison between the border-derived opacity α(Pi) and the second opacity α'(Pi). For example, a typical logic sequence may resemble:

IF $(|α'-α|≤T7)$ OR if $(E'_{rel}≤T8)$, THEN final opacity=second opacity α'(Pi), ELSE final opacity =border-derived opacity α(Pi), where T7 and T8 are predetermined error thresholds. In one implementation, values for T7 and T8 are, respectively, 0.5 and 0.1. Thus, using this logic, the border-derived opacity α(Pi) is selected if the border-derived opacity α(Pi) and the second opacity α'(Pi) disagree by a significant amount and the relative error in the second opacity α'(Pi) is high.

The following relationship may be used to determine a final opacity:

$$α_F=β×α+(1-β)×α',$$

where $β=|α'-α|+E_{rel}(α')-T9$, and $β=min(β,1)$ or $β=max(β, 0)$, and T9 is a predetermined error threshold.

What is claimed is:

1. A method for identifying a border in a digital image, the digital image defined by a plurality of pixels, each pixel defined by a pixel color and a pixel position indicating a location of the pixel in the digital image, the method comprising:
   receiving as an input an area of interest that includes at least a portion of the border to be identified;
   estimating information about an edge zone that models the border portion, the estimating including:
      estimating a position of the edge zone including calculating a weighted average value of pixel positions of each pixel in the area of interest;
      estimating a width of the edge zone;
      calculating a measure of confidence in the edge zone information; and
      estimating a width of the edge zone at which the calculated measure of confidence decreases appreciably if the estimated edge zone width increases; and
   using the estimated edge zone information to identify the border.

2. The method of claim 1 in which receiving the area of interest includes receiving a user input indicating the area of interest.

3. The method of claim 1 further comprising receiving for each pixel in the area of interest, a pixel gradient indicating a direction and magnitude of change in color, in which calculating the weighted average value of pixel positions includes weighting each position of a pixel in the area of interest by a first function of a gradient magnitude at the pixel.

4. The method of claim 3 in which calculating the weighted average value of pixel positions includes weighting each position of a pixel in the area of interest by a second function of a difference between the pixel gradient direction and a predetermined bias direction.

5. The method of claim 4 in which the bias direction is a previously estimated edge zone direction.

6. The method of claim 4 in which the bias direction is derived by comparing a location of a previous area of interest to the area of interest.

7. The method of claim 4 in which estimating the weighted average value of pixel positions includes:
   estimating a center of the area of interest, and weighting each position of a pixel in the area of interest by a third function of a difference between the pixel position and the estimated area of interest center.

8. The method of claim 7 in which estimating the area of interest center includes accessing a previously estimated edge zone position.

9. The method of claim 8 in which receiving the area of interest includes receiving information relating to the area of interest through a user controlled graphical interface device and in which estimating the center of the area of interest includes finding one or more local maxima of a function of the gradients along a path that intersects the graphical interface device and lies parallel to a predetermined direction relating to the edge zone.

10. The method of claim 9 in which the predetermined direction relating to the edge zone is a previously estimated normal direction of the identified border.

11. The method of claim 9 in which estimating the center of the area of interest includes selecting as the center of the area of interest one of the local maxima including:
   finding a distance between a local maximum and a previously estimated edge zone position, and
   calculating a gradient value of the pixels that are crossed along a path connecting the previously estimated edge zone position and the local maximum.

12. The method of claim 9 in which estimating the center of the area of interest includes selecting as the center of the area of interest one of the local maxima including calculating an average value over pixels along a path between the selected local maximum and a previously estimated edge zone position, the average value corresponding to an amount of agreement in gradient angle with the predetermined direction.

13. The method of claim 9 in which estimating the center of the area of interest includes selecting as the center of the area of interest one of the local maxima that lies in the identified border.

14. The method of claim 1 further comprising receiving for each pixel in the area of interest, a pixel gradient indicating a direction and magnitude of change in color, in which estimating information about the edge zone includes estimating a direction of the edge zone including calculating a weighted average value of pixel gradient directions at each pixel in the area of interest.

15. The method of claim 14 in which calculating the measure of confidence in the edge zone information includes calculating an average value of a difference between the estimated edge zone direction and the pixel gradient direction at each pixel over an estimated edge zone area.

16. The method of claim 15 in which identifying the border includes:
   comparing the position of a pixel in the area of interest to the estimated edge zone position to determine a relative position of the pixel; and
   calculating an opacity for a pixel in the area of interest based on the relative position.

17. The method of claim 16 in which comparing the position of the pixel in the area of interest to the estimated edge zone position includes comparing the position of the pixel to the estimated edge zone position along the estimated edge zone direction.

18. The method of claim 17 in which calculating the opacity includes calculating a value based on the comparison and the estimated edge zone width.

19. The method of claim 16 further comprising:
receiving as the input a second area of interest, in which the second area of interest includes at least a portion of the border to be identified, and the portion is modeled by a second edge zone,
receiving for each pixel in the second area of interest, a pixel gradient indicating a direction and magnitude of change in color,
estimating a position of the edge zone for the second area of interest including calculating a weighted average value of pixel positions of each pixel in the second area of interest,
estimating a direction of the edge zone for the second area of interest including calculating a weighted average value of gradient directions at each pixel in the second area of interest,
estimating a width of the edge zone for the second area of interest;
calculating a measure of confidence in the edge zone direction, the edge zone position, and the edge zone width for the second area of interest,
estimating for the second area of interest a width of the edge zone at which the calculated measure of confidence decreases appreciably if the estimated width increases, and
calculating an opacity for a pixel in the second area of interest including comparing the position of the pixel in the other area of interest to the estimated edge zone position for the second area of interest to determine another relative position of the pixel.

20. The method of claim 19 further comprising analyzing the calculated measures of confidence for those areas of interest in which a pixel is included and calculating a border-derived opacity for the pixel based on the analyzed measures of confidence.

21. The method of claim 20 in which analyzing the calculated measures of confidence includes calculating a measure of confidence that corresponds to an acceptable measure of confidence and calculating the border-derived opacity includes selecting an opacity corresponding to an acceptable measure of confidence.

22. The method of claim 20 in which calculating the border-derived opacity includes weighting each opacity by a corresponding calculated measure of confidence to produce a weighted average value for the opacities for each pixel.

23. The method of claim 20 in which calculating the border-derived opacity includes selecting an opacity corresponding to a most recently calculated opacity for a given pixel.

24. The method of claim 19 further comprising masking a region of the digital image including receiving input from a user indicating the region to mask.

25. The method of claim 24 in which masking the region of the digital image includes:
calculating a second opacity for a pixel using a color space computation based on a linear blend model,
comparing the border-derived opacity to the second opacity, and
calculating a final opacity for the given pixel.

26. The method of claim 25 in which calculating the final opacity includes analyzing one or more of the measures of confidence in the areas of interest in which the pixel is included.

27. The method of claim 25 in which determining the final opacity includes:
estimating an error in calculating the border-derived opacity,
estimating an error in calculating the second opacity, and
selecting a final opacity from the group of the border-derived opacity, the second opacity, and a composite opacity that depends on the border-derived opacity and the second opacity based on the estimated errors.

28. The method of claim 14 further comprising automatically indicating to a user the estimated edge zone information.

29. The method of claim 28 further comprising enabling the user to identify the area of interest using the indicated edge zone information.

30. The method of claim 29 further comprising automatically indicating to the user the estimated edge zone position.

31. The method of claim 29 further comprising automatically indicating to the user the estimated edge zone direction.

32. The method of claim 29 further comprising automatically indicating to the user the estimated edge zone width.

33. The method of claim 29 further comprising automatically indicating to the user the calculated measure of confidence.

34. The method of claim 19 in which using the estimated edge zone information includes combining the edge zone with the second edge zone.

35. The method of claim 34 in which combining the edge zone with the second edge zone includes determining a union of the second edge zone with the edge zone.

36. The method of claim 34 in which combining the edge zone with the second edge zone includes combining the opacity for each of the pixels in the area of interest with the opacity for each of the pixels in the second area of interest.

37. The method of claim 14 in which the edge zone width is estimated along the estimated edge zone direction.

38. The method of claim 1 in which the border includes one or more pixels along a direction normal to a general direction of the border.

39. A method for interactively indicating to a user an identified edge zone in a digital image, the digital image defined by a plurality of pixels, each pixel being defined by a pixel color and a pixel position indicating a location of the pixel in the digital image, the method comprising:
receiving for each pixel in the digital image, a pixel gradient indicating a direction and magnitude of change in color;
receiving as an input an area of interest that includes at least a portion of the edge zone to be identified;
estimating a position and direction of the edge zone based on the pixel positions and gradients in the area of interest;
estimating a width of the edge zone;
calculating a measure of confidence in the estimated edge zone position, width and direction;
based on the estimated position and direction, and calculated measure of confidence, estimating a width of the edge zone;
automatically indicating to the user the estimated width of the edge zone; and receiving a user modification of a next area of interest based on the indication.

40. The method of claim 39 further comprising automatically indicating the position of the edge zone.

41. The method of claim 39 further comprising automatically indicating the direction of the edge zone.

42. The method of claim 39 further comprising automatically indicating the calculated measure of confidence in the estimated edge zone position, direction, and width.

43. A method for identifying an edge zone in a digital image, the digital image defined by a plurality of pixels, each pixel defined by a pixel color and a pixel position indicating a location of the pixel in the digital image, the method comprising:
receiving for each pixel in the digital image, a pixel gradient indicating a direction and magnitude of change in color;
receiving as an input an area of interest that includes at least a part of the edge zone to be identified;
receiving a direction based on an area of interest adjacent to the inputted area of interest;
estimating a position and direction of the edge zone based on the positions and gradients at pixels in the area of interest and the received direction;
estimating an initial width of the edge zone;
calculating a measure of confidence in the estimated edge zone position, direction and width; and
based on the calculated measure of confidence and estimated initial width, estimating a width of the edge zone to identify the edge zone.

44. A method for extracting an object from a background in a digital image, the digital image defined by a plurality of pixels, each pixel being defined by a pixel color and a pixel position indicating a location of the pixel in the digital image, the method comprising:
receiving as an input an area of interest that includes at least a part of a border, the border relating to an object;
estimating a position, direction, width, and measure of confidence of a portion of the border that lies within the area of interest;
identifying the border based on the estimated position, direction, measure of confidence, and width of the border portion;
estimating an opacity of each pixel in the digital image including, for each pixel, comparing a first opacity calculated using the identified border and a second opacity calculated by analyzing colors in a predetermined neighborhood near the pixel; and
extracting the object from the image including estimating an intrinsic color of a pixel in the object.

45. The method of claim 44 in which the second opacity for a pixel is calculated using a color space computation based on a linear blend model.

46. A computer-implemented system for identifying a border in a digital image, the digital image defined by a plurality of pixels, the border being modeled by a plurality of edge zones, each pixel being defined by a pixel color and a pixel position indicating a location of the pixel in the digital image, the system comprising:
a storage device configured to store the digital image; and
a processor configured to:
receive as an input an area of interest that includes at least a portion of the border to be identified;
estimate a position of an edge zone by calculating a weighted average value of pixel positions of each pixel in the area of interest;
estimate an initial width of the edge zone;
calculate a measure of confidence in the edge zone position and initial width;
estimate a width of the edge zone at which the calculated measure of confidence decreases appreciably if the estimated initial width increases to identify the edge zone; and
use the estimated edge zone position and width, and calculated measure of confidence to identify the border.

47. Computer software, tangibly embodied in a computer-readable medium or a propagated carrier signal, for identifying a border in a digital image defined by a plurality of pixels, the border being modeled by a plurality of edge zones, each pixel being defined by a pixel color and a pixel position indicating a location of the pixel in the digital image, the software comprising instructions to perform the following operations:
receive as input an area of interest that includes at least a part of an edge zone to be identified;
estimate a position of the edge zone by calculating a weighted average value of pixel positions of each pixel in the area of interest;
estimate an initial width of the edge zone;
calculate a measure of confidence in the edge zone position and initial width;
estimate a width of the edge zone at which the calculated measure of confidence decreases appreciably if the estimate initial width increases to identify the edge zone; and
use the estimated edge zone width and position, and calculated measure of confidence to identify the border.

48. The software of claim 47 in which the Suctions to receive the area of interest further include instructions to receive a user input indicating the area of interest.

49. The software of claim 47 further comprising instructions to receive for each pixel in the area of interest a pixel gradient indicating a direction and magnitude of change in color, in which the instructions to calculate the weighted average value of pixel positions include instructions to weight each position of a pixel in the area of interest by a first function of a gradient magnitude at the pixel.

50. The software of claim 49 in which the instructions to calculate the weighted average value of pixel positions include instructions to weight each position of a pixel in the area of interest by a second function of a difference between the pixel gradient direction and a predetermined bias direction.

51. The software of claim 50 in which the bias direction is a previously estimated edge zone direction.

52. The software of claim 50 in which the bias direction is derived by comparing a location of a previous area of interest to the area of interest.

53. The software of claim 50 in which the instructions to calculate the weighted average value of pixel positions includes instructions to perform the following operations:
estimate a center of the area of interest and
weight each position of a pixel in the area of interest by a third function of a difference between the pixel position and the estimated area of interest center.

54. The software of claim 53 in which the instructions to estimate the area of interest center include instructions to access a previously estimated edge zone position.

55. The software of claim 54 in which the instructions to receive the area of interest include instructions to receive information relating to the area of interest trough a user controlled graphical interface device and m which the instructions to estimate the center of the area of interest include instructions to find one or more local ma of a function of the gradients along a path that intersects the graphical interface device and lies parallel to a predetermined direction relating to the edge zone.

56. The software of claim 55 in which the predetermined direction relating to tho edge zone is a previously estimated normal direction of the identified border.

57. The software of claim 55 in which the instructions to estimate the center of the area of interest include instructions to select as the center of the area of interest one of the local maxima and instructions to perform the following operations:

find a distance between a local maximum and a previously estimated edge zone position, and calculate a gradient value of the pixels that are crossed along a path connecting the previously estimated edge zone position and the local maximum.

58. The software of claim 55 in which the instructions to estimate the center of the area of interest include instructions to select as the center of the area of interest one of the local the instructions to select including instructions to calculate an average value over pixels along a path between the selected local maximum and a previously estimated edge zone position, the average value corresponding to an amount of agreement in gradient angle with the predetermined direction.

59. The software of claim 55 in which the instructions to estimate the center of the area of interest include instructions to select as the center of the area of interest one of the local maxima that lies in the identified border.

60. The software of claim 47 further comprising instructions to receive, for each pixel in the area of interest, a pixel gradient indicating a direction and magnitude of change in color, in which the instructions to estimate information about the edge zone include instructions to estimate a direction of the edge zone that include instructions to calculate a weighted average value of pixel gradient directions at each pixel in the area of interest.

61. The software of claim 60 in which the instructions to calculate the measure of confidence in the edge zone information include instructions to calculate an average value of a difference between the estimated edge zone direction and the pixel gradient direction at each pixel over an estimated edge zone area.

62. The software of claim 61 in which the instructions to identity the border include instructions to perform the following operations.

compare the position of a pixel in the area of interest to the estimated edge zone position to determine a relative position of the pixel; and calculate an opacity for a pixel in the area of interest based on the relative position.

63. The software of claim 62 in which the instructions to compare the position of the pixel in the area of interest to the estimated edge zone position include instructions to compare the position of the pixel to the estimated edge zone position along the estimated edge zone direction.

64. The software of claim 63 in which the instructions to calculate the opacity include instructions to calculate a value based on the comparison and the estimated edge zone width.

65. The software of claim 62 further comprising instructions to:

receive as the input a second aria of interest, in which the second area of interest includes at least a portion of the border to be identified, and the portion is modeled by a second edge zone, receive for each pixel in the second area of interest, a pixel gradient indicating a direction and magnitude of change in color, estimate a position of the edge zone for the second area of interest including calculating a weighted average value of pixel positions of each pixel in the second area of interest, estimate a direction of the edge zone for the second area of interest including calculating a weighted average value of gradient directions at each pixel in the second area of interest, estimate a width of the edge zone for the second area of interest;

calculate a measure of confidence in the edge zone direction, the edge zone position, and the edge zone width for the second area of interest, estimate for the second area of interest a width of the edge zone at which the calculated measure of confidence decreases appreciably if the estimated width increases, and calculate an opacity for a pixel in the second area of interest including comparing the position of the pixel in the other area of interest to the estimated edge 7 zone position for the second area of interest to determine another relative position of the pixel.

66. The software of claim 65 further comprising instructions to analyze the calculated measures of confidence for those areas of interest in which a pixel is included and to calculate a border-derived opacity for the pixel based on the analyzed measures of confidence.

67. The software of claim 66 in which the instructions to analyze the calculated measures of confidence include instructions to calculate a measure of confidence that corresponds to an acceptable measure of confidence and to calculate the border-derived opacity by selecting an opacity corresponding to an acceptable measure of confidence.

68. The software of claim 66 in which the instructions to calculate the border-derived opacity include instructions to weight each opacity by a corresponding calculated measure of confidence to produce a weighted average value for the opacities for each pixel.

69. The software of claim 66 in which the instructions to calculate the border-derived opacity include instructions to select an opacity corresponding to a most recently calculated opacity for a given pixel.

70. The software of claim 65 further comprising instructions to mask a region of the digital image and to receive input from a user indicating the region to mask.

71. The software of claim 70 in which the instructions to mask the region of the digital image include instructions to perform the following operations:

calculate a second opacity for a pixel using a color space computation based on a linear blend model, compare the border-derived opacity to We second opacity, and calculate a final opacity for the given pixel.

72. The software of claim 71 in which the instructions to calculate the final opacity include instructions to analyze one or more of the measures of confidence in the areas of interest in which the pixel is included.

73. The software of claim 71 in which the instructions to determine the final opacity include instructions to perform the following operations:

estimate an error in calculating the border-derived opacity, estimate an error in calculating the second opacity, and select a final opacity from the group of the border-derived opacity, the second opacity, and a composite opacity that depends on the border-derived opacity and the second opacity based on the estimated errors.

74. The software of claim 60 further comprising instructions to automatically indicate to a user the estimated edge zone information.

75. The software of claim 74 further comprising instructions to enable the user to identify the area of interest using the indicated edge zone information.

76. The software of claim 75 comprising instructions to automatically indicate to the user the estimated edge zone position.

77. The software of claim 75 further comprising instructions to automatically indicate to the user the estimated edge zone direction.

78. The software of claim 75 further comprising instructions to automatically indicate to the user the estimated edge zone width.

79. The software of claim 75 further comprising instructions to automatically indicate to the user the calculated measure of confidence.

80. The software of claim 65 in which the instructions to use the estimated edge zone information include instructions to combine the edge zone with the second edge zone.

81. The software of claim 80 in which the instructions to combine the edge zone with the second edge zone include instructions to determine a union of the second edge zone with the edge zone.

82. The software of clam 80 in which the instructions to combine the edge zone with the second edge zone include instructions to combine die opacity for each of the pixels in the area of interest with the capacity for each of the pixels in the second area of interest.

83. The software of claim 60 in which the instructions to estimate the edge zone width include instructions to estimate the edge zone width along the estimated edge zone direction.

84. The software of claim 47 in which the border includes one or more pixels along a direction normal to a general direction of the border.

85. Computer software tangibly embodied in a computerable medium or a propagated carrier signal, for interactively indicating to a user an identified edge zone in a digital image, the digital image defined by a plurality of pixels, each pixel being defined by a pixel color and a pixel position indicating a location of the pixel in the digital image, the software comprising instructions to perform the following operations:

receive for each pixel in the digital image, a pixel gradient indicating a direction and magnitude of change in color, receive as an input an area of interest that includes at least a portion of the edge zone to be identified;

estimate a position and direction of the edge zone based on the pixel positions and gradients in the area of interest;

estimate a width of the edge zone;

calculate a measure of confidence in the estimated edge zone position, width, and direction;

based on the estimated position and direction, and calculated measure of confidence, estimate a width of tie edge zone;

automatically indicate to the user the estimated width of the edge zone; and receive a user modification of a next area of interest based on the indication.

86. The software of claim 85 further comprising instructions to automatically indicate the position of the edge zone.

87. The software of claim 85 further comprising instructions to automatically indicate the direction of the edge zone.

88. The software of claim 85 further comprising instructions to automatically indicate the calculated measure of confidence in the estimated edge zone position, direction, and width.

89. Computer software, tangibly embodied in a computer-readable medium or a propagated carrier signal, for identifying an edge zone in a digital image, the digital image defined by a plurality of pixels, each pixel defined by a pixel color and a pixel position indicating a location of the pixel in the digital image, the software comprising instructions to perform the following operations:

receive for each pixel in the digital image, a pixel gradient indicating a direction and magnitude of change in color;

receive as an input an area of interest that include at least a part of the edge zone to be identified;

receive a direction based on an area of interest adjacent to the inputted area of interest;

estimate a position and direction of the edge zone based on the positions and gradients at pixels in the area of interest and the received direction;

estimate an initial width of the edge zone;

calculate a measure of confidence in the estimated edge zone position, direction and width; and based on the calculated measure of confidence and estimated initial width, estimate a width of the edge zone to identify the edge zone.

90. Computer software, tangibly embodied in a computer-readable medium or a propagated carrier signal, for extracting an object from a background in a digital image, the digital image defined by a plurality of pixels, each pixel being defined by a pixel color and a pixel position indicating a location of the pixel in the digital image, the software instructions comprising instructions to perform the following operations receive as an input an area of interest that includes at least a part of a border, the border relating to an object;

estimate a position, direction, width, and measure of confidence of a portion of the border that lies within the area of interest;

identify the border based on the estimated position, direction, measure of confidence, and width of the border portion;

estimate an opacity of each pixel in the digital image including, for each pixel, comparing a first opacity calculated using the identified border and a second opacity calculated by analyzing colors in a predetermined neighborhood near the pixel; and extract the object from the image including estimating an intrinsic color of a pixel in the object.

91. The software of claim 90 in which the second opacity for a pixel is calculated using a color space computation based on a linear blend model.

* * * * *

UNITED STATES PATENT AND TRADEMARK OFFICE
CERTIFICATE OF CORRECTION

PATENT NO. : 6,337,925 B1
DATED : January 8, 2002
INVENTOR(S) : Gregg D. Wilensky and Scott D. Cohen It is certified that error appears in the above-identified patent and that said Letters Patent is hereby corrected as shown below:

Column 28,
Line 33, please delete "Suctions" and insert -- instructions --.
Line 67, please delete "trough" and insert -- through --.

Column 29,
Line 1, please delete "m which" and insert -- in which --.
Line 3, please delete "local ma" and insert -- local maxima --.
Line 8, please delete "tho" and insert -- the --.
Line 22, after "local" please insert -- maxima --.
Line 48, please delete "identity" and insert -- identify --.
Line 65, please delete "aria" and insert -- area --.

Column 30,
Line 25, after "estimated edge", please delete "7".
Line 56, please delete "We" and insert -- the --.

Column 31,
Line 14, after "claim 75" please insert -- further --.
Line 33, please delete "clam" and insert -- claim --.
Line 35, please delete "die" and insert -- the --.
Line 36, please delete "capacity" and insert -- opacity --.
Line 45, please delete "able" and insert -- readable --.
Line 53, please delete "color," and insert -- color; --.
Line 63, please delete "tie" and insert -- the --.

Column 32,
Line 23, please delete "include" and insert -- includes --.
Line 43, please delete "operations" and insert -- operations: --

Signed and Sealed this

Twenty-fifth Day of June, 2002

*Attest:*

JAMES E. ROGAN
*Attesting Officer*     *Director of the United States Patent and Trademark Office*